United States Patent
Lackner et al.

(10) Patent No.: US 12,200,069 B2
(45) Date of Patent: *Jan. 14, 2025

(54) METHOD AND SYSTEM FOR APPLICATION PERFORMANCE NEUTRAL, NETWORK BANDWIDTH OPTIMIZED CAPTURING OF RESOURCES USED DURING THE INTERACTION OF USER WITH A WEB-BASED APPLICATION TO CREATE MONITORING DATA FOR AN ACCURATE VISUAL RECONSTRUCTION OF THE USER EXPERIENCE

(71) Applicant: Dynatrace LLC, Waltham, MA (US)

(72) Inventors: Bernhard Lackner, Linz (AT); Jordi Masramon, Barcelona (ES); Otmar Ertl, Linz (AT); Alfonso Corretti, Barcelona (ES)

(73) Assignee: Dynatrace LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,206

(22) Filed: Dec. 1, 2023

(65) Prior Publication Data

US 2024/0106903 A1 Mar. 28, 2024

Related U.S. Application Data

(63) Continuation of application No. 17/992,999, filed on Nov. 23, 2022, now Pat. No. 11,863,632.

(60) Provisional application No. 63/296,283, filed on Jan. 4, 2022, provisional application No. 63/283,754, filed on Nov. 29, 2021.

(51) Int. Cl.
 *H04L 67/146* (2022.01)
 *H04L 67/50* (2022.01)

(52) U.S. Cl.
 CPC .......... *H04L 67/146* (2013.01); *H04L 67/535* (2022.05)

(58) Field of Classification Search
 None
 See application file for complete search history.

(56) References Cited

U.S. PATENT DOCUMENTS

| 6,418,471 B1 | 7/2002 | Shelton et al. |
| 9,356,842 B2 | 5/2016 | Greifeneder et al. |

(Continued)

*Primary Examiner* — Bryan Y Lee
(74) *Attorney, Agent, or Firm* — Harness, Dickey & Pierce, P.L.C.

(57) ABSTRACT

A technology is disclosed for the browser side capturing of user interaction session data and replay of the session data for a high-fidelity reconstruction of the experience the user perceived. In addition to capturing central structuring and markup documents and browser side updates thereof, additional resource documents that are loaded and used by the browser to render the central documents are captured and added to the session recording data. Identification information is created for resource documents, based on the content of those documents, which allows the capturing system to distinguish different versions of those content documents that share the same name but have different content. The captured session data contains data to identify the correct versions of resource documents during replay. Various measures to reduce the amount of transferred resource content data are applied, that consider already captured resource document versions or the usage frequency of a monitored application.

21 Claims, 15 Drawing Sheets

System Overview

(56) References Cited

U.S. PATENT DOCUMENTS

| | | |
|---|---|---|
| 9,766,769 B1 | 9/2017 | Webber et al. |
| 9,927,947 B1 | 3/2018 | Webber et al. |
| 10,846,193 B2 | 11/2020 | Lackner et al. |
| 11,184,406 B1 | 11/2021 | Shashank |
| 2002/0065912 A1* | 5/2002 | Catchpole ................. H04L 9/40 |
| | | 713/168 |
| 2013/0185643 A1 | 7/2013 | Greifeneder et al. |
| 2014/0195858 A1 | 7/2014 | Cohen |
| 2017/0019489 A1 | 1/2017 | Churchill |
| 2018/0173375 A1 | 6/2018 | Webber et al. |
| 2019/0171542 A1 | 6/2019 | Lackner et al. |

* cited by examiner

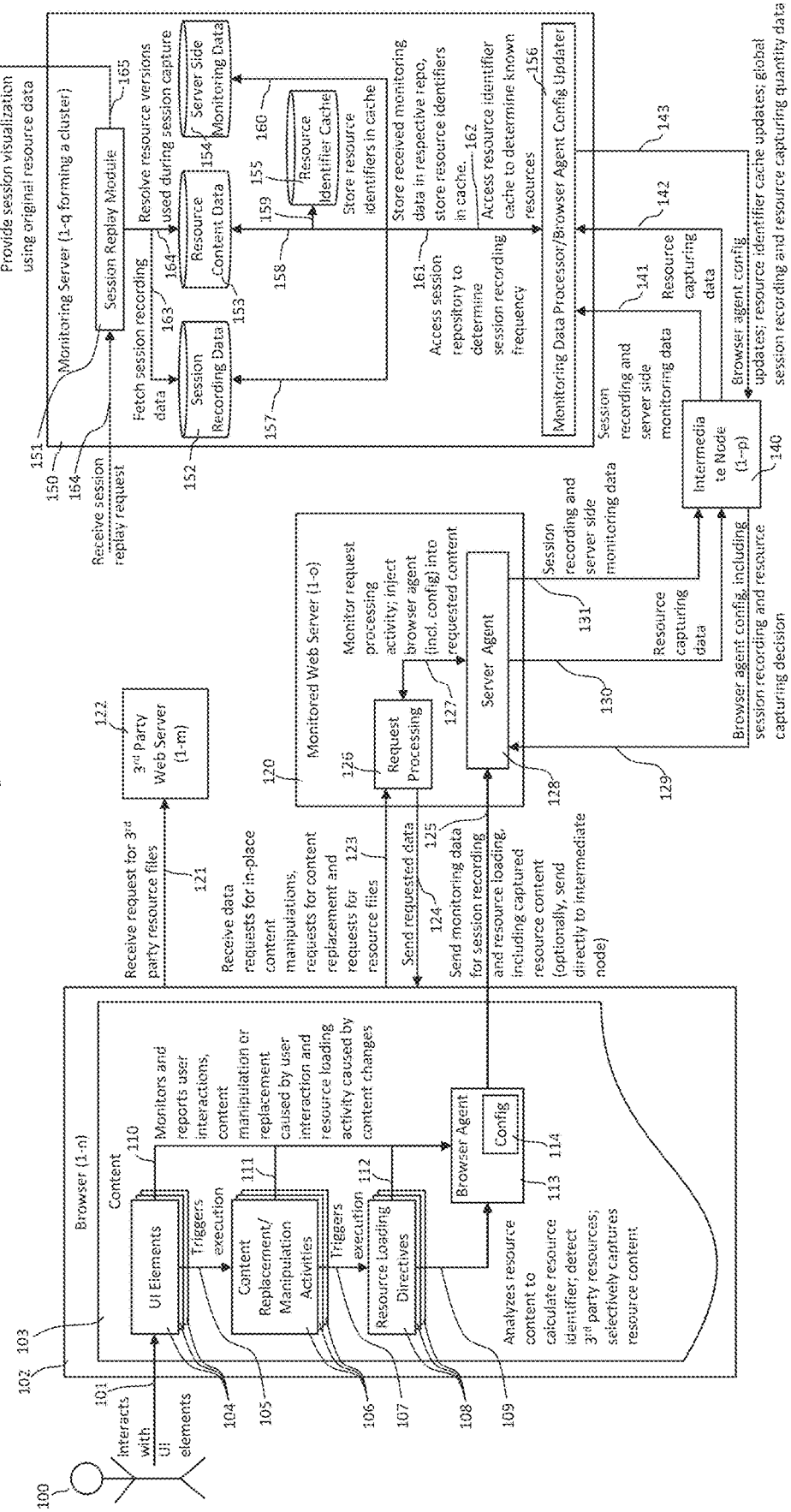
FIG 1: System Overview

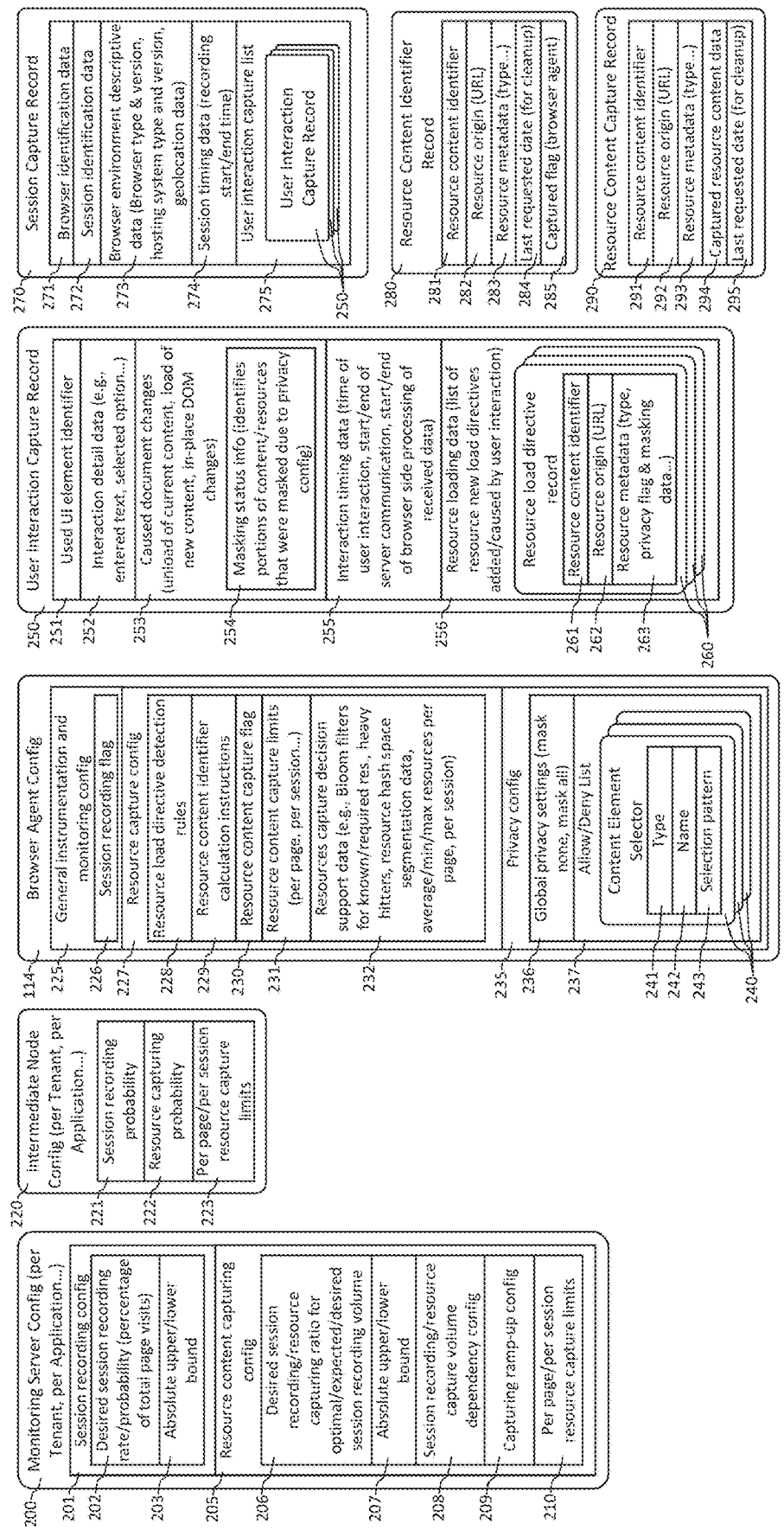
FIG. 2 Monitoring Activity Configuration and Monitoring Data Records

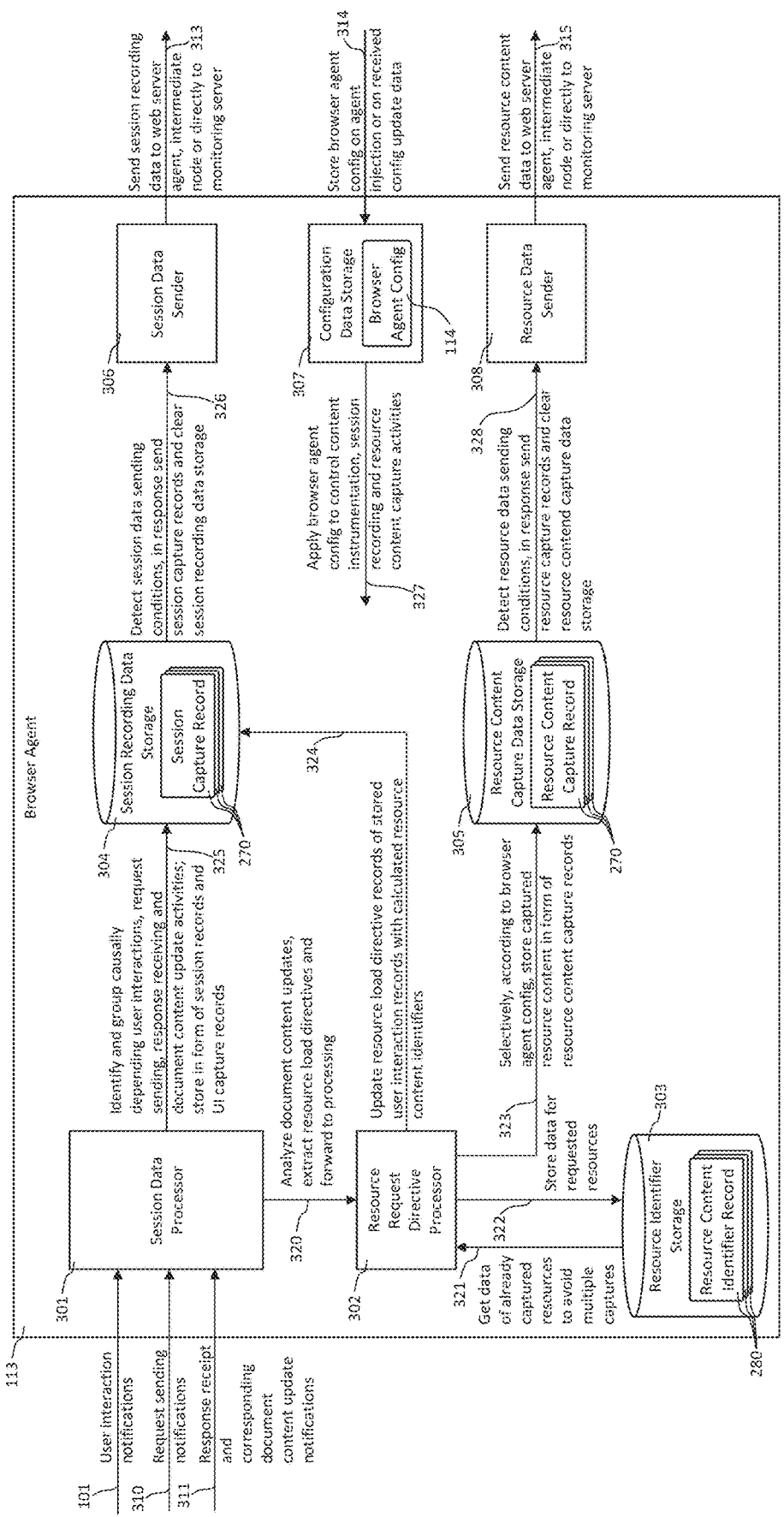

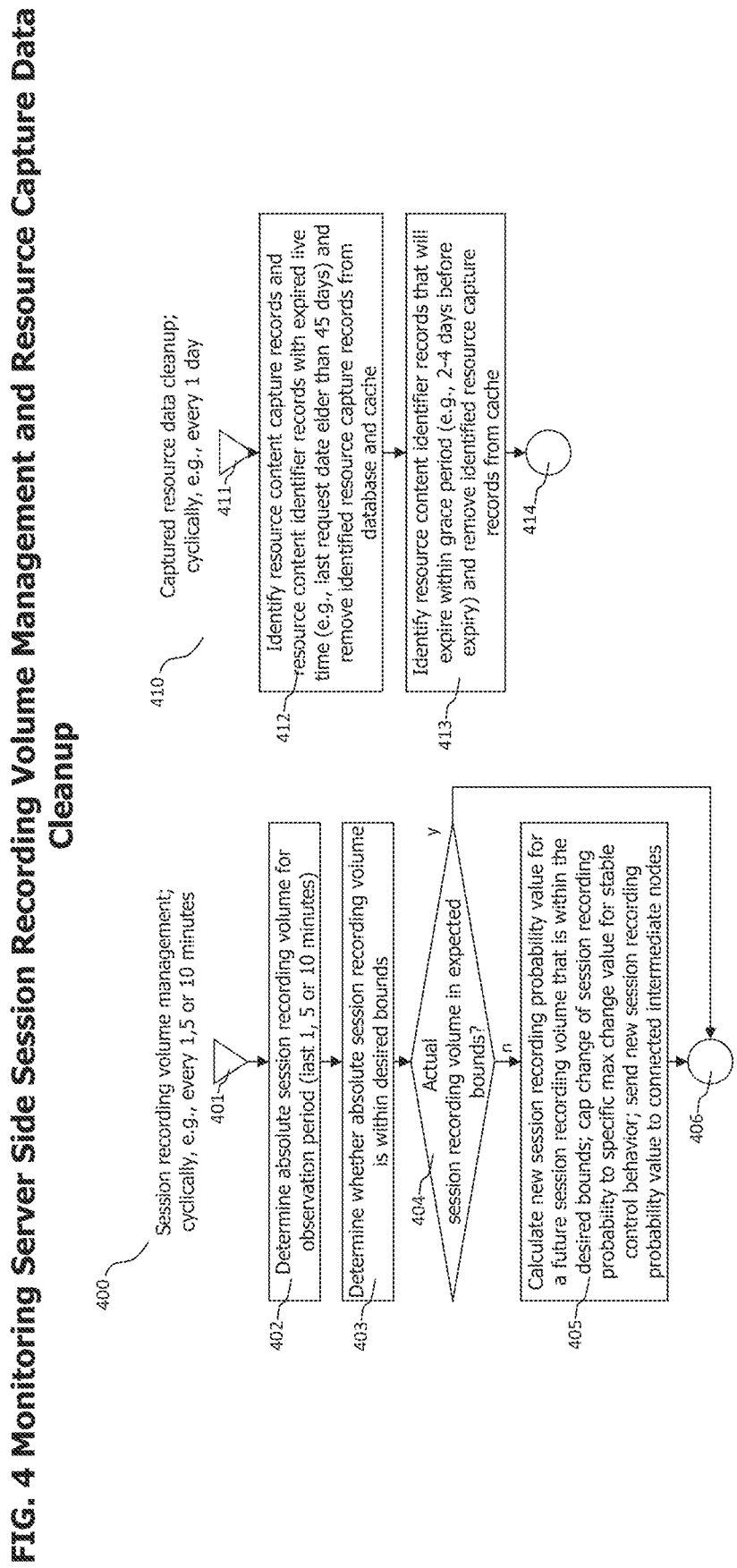
FIG. 4 Monitoring Server Side Session Recording Volume Management and Resource Capture Data Cleanup

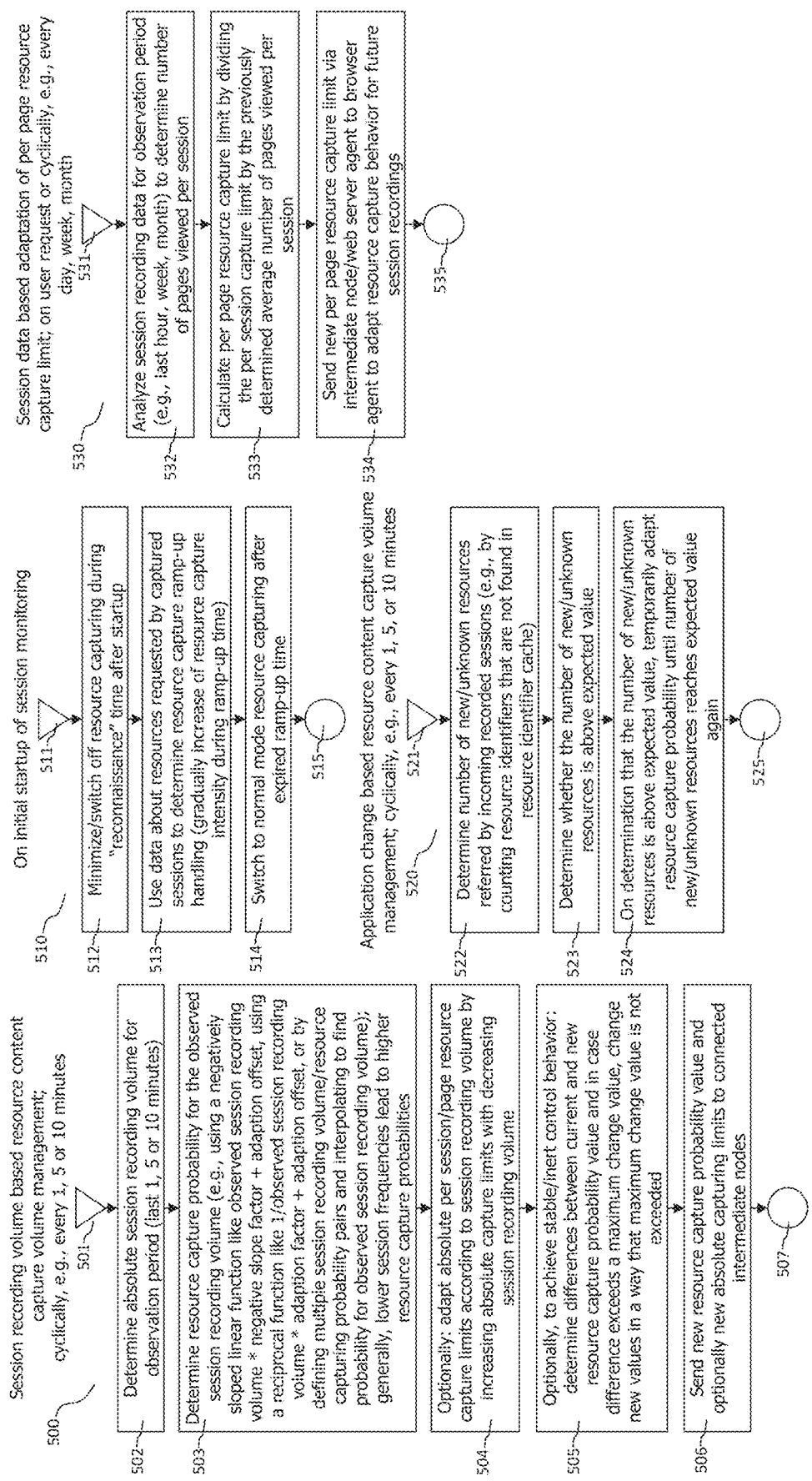

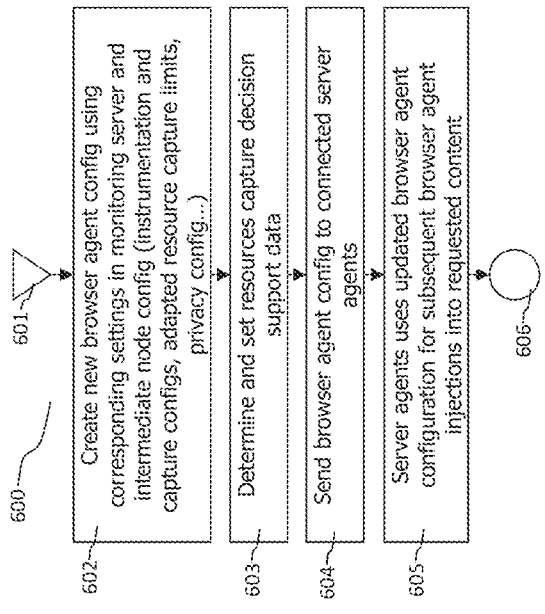

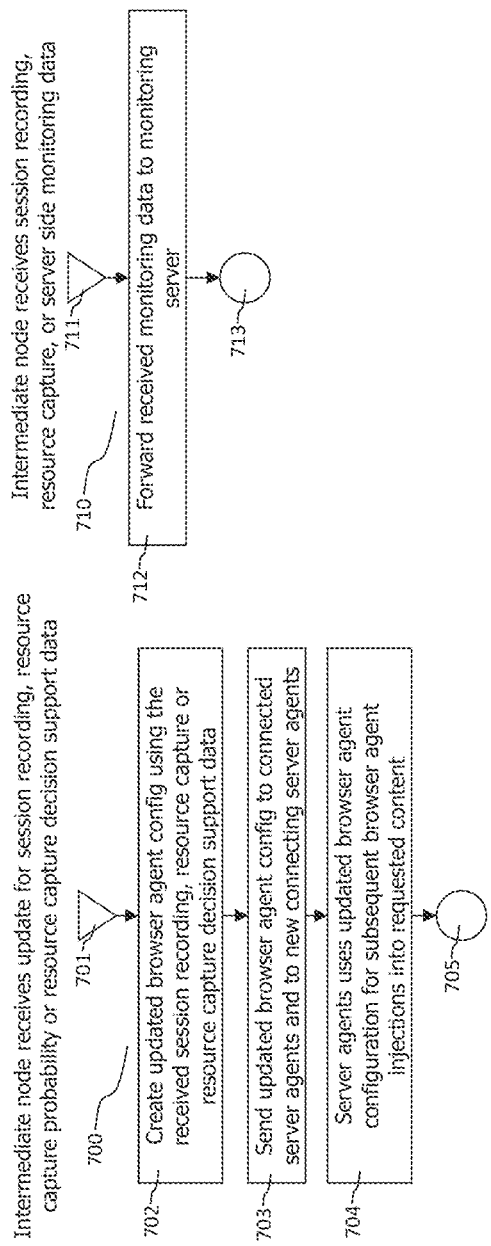

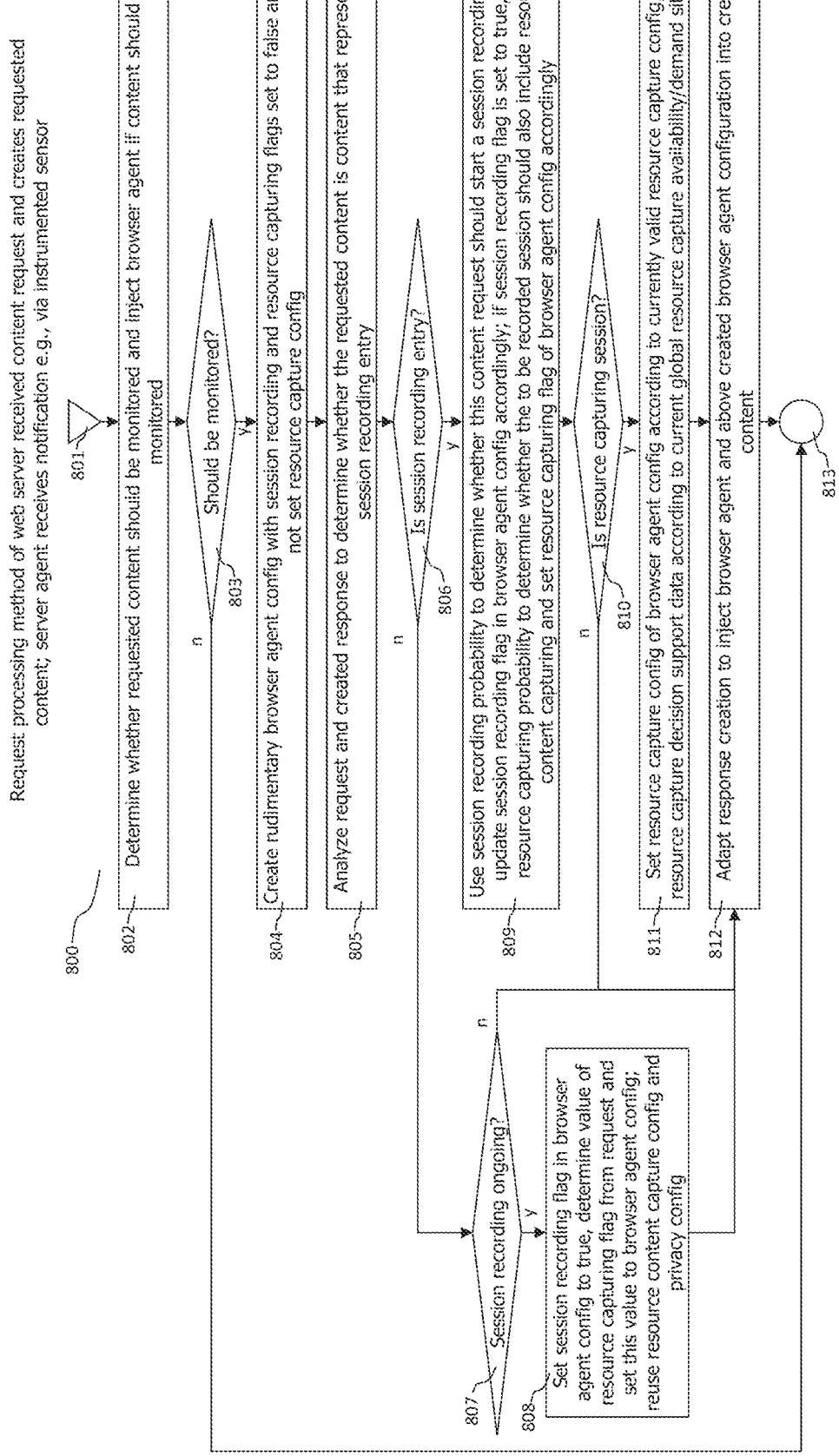
FIG. 8 Server Agent Processes Monitored Content Request

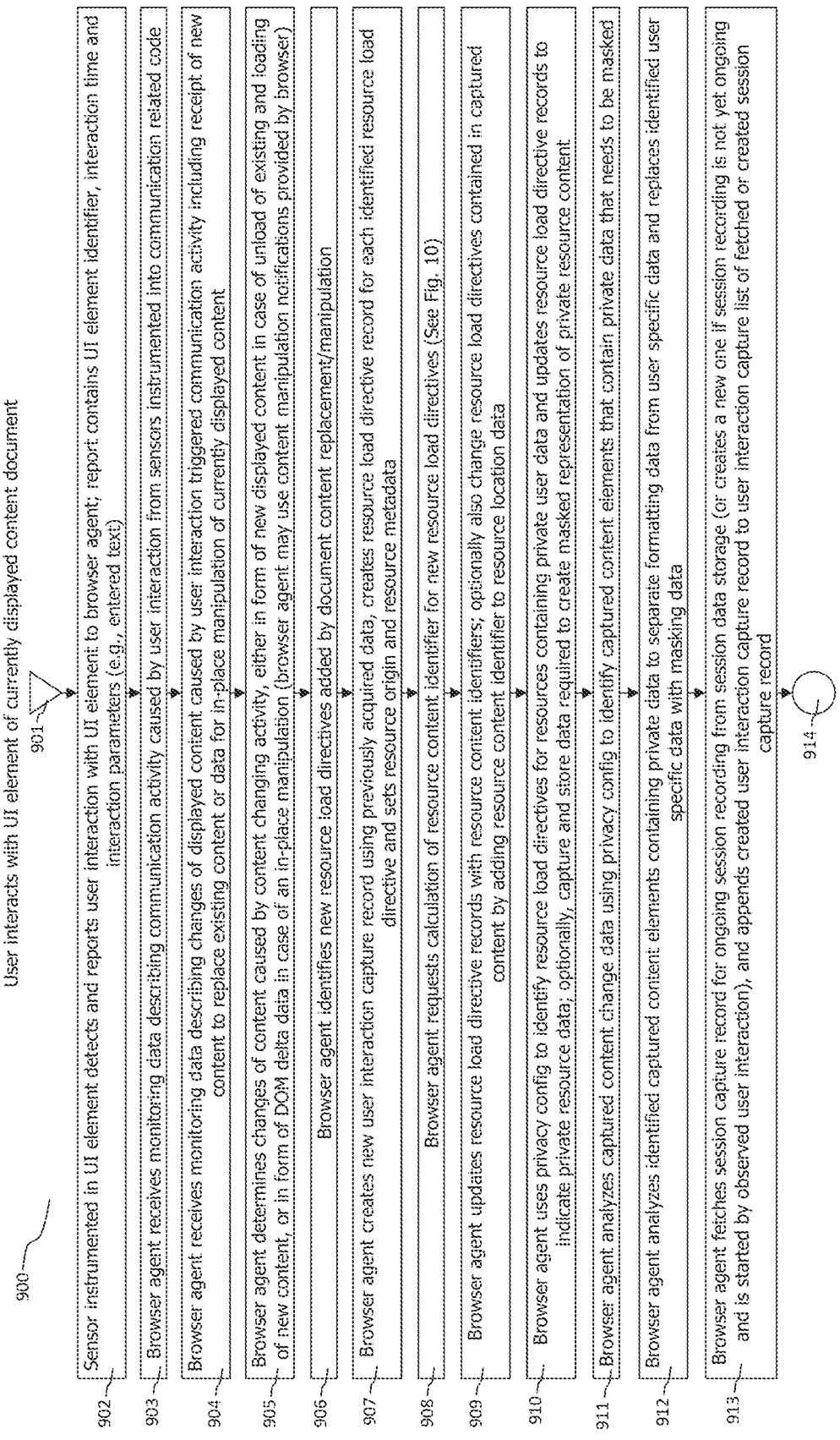
FIG. 9 Browser Agent Side User Interaction Processing

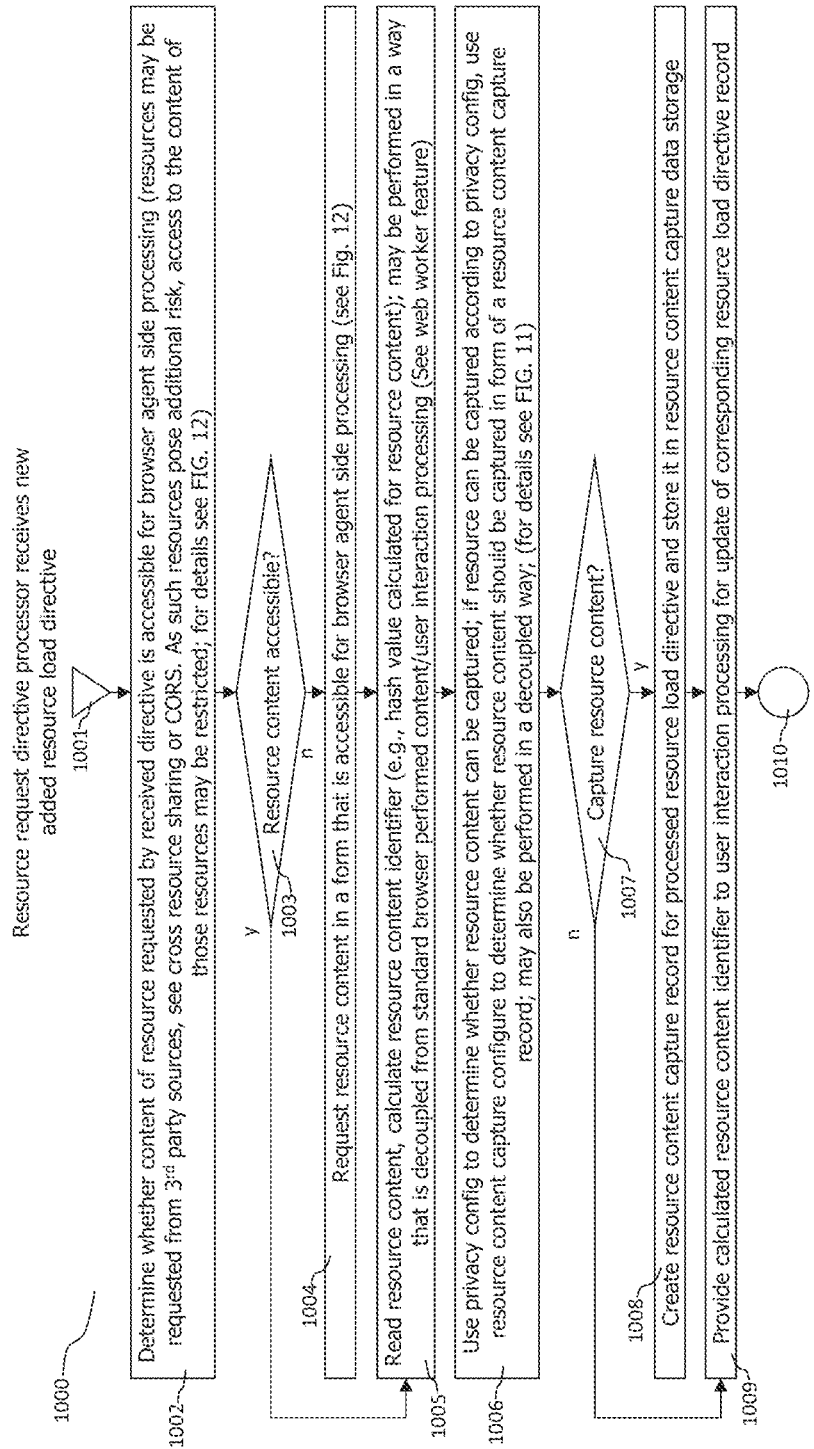
FIG. 10 Browser Agent Side Processing of Resource Load Directives

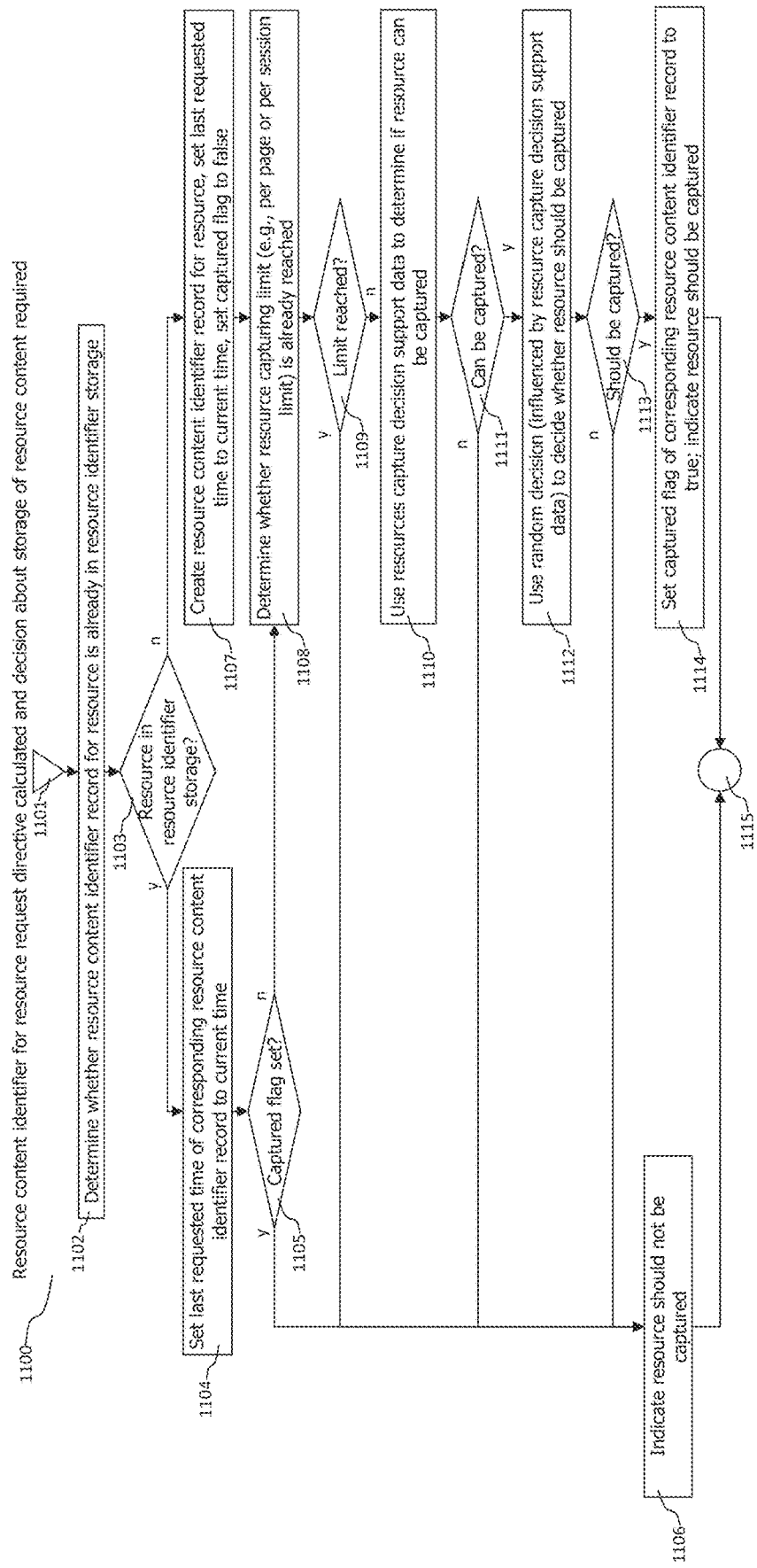
FIG. 11 Resource Capture Decision Processing

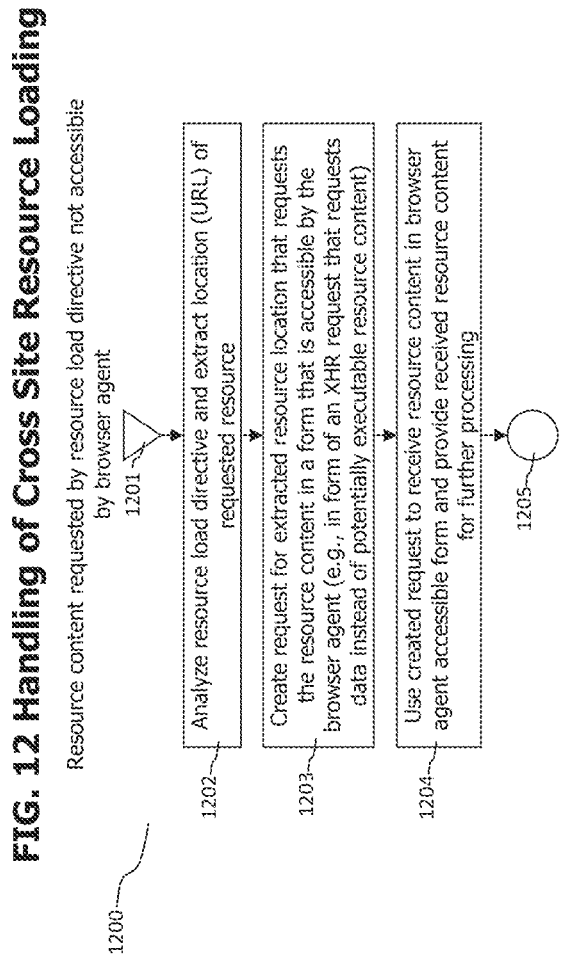

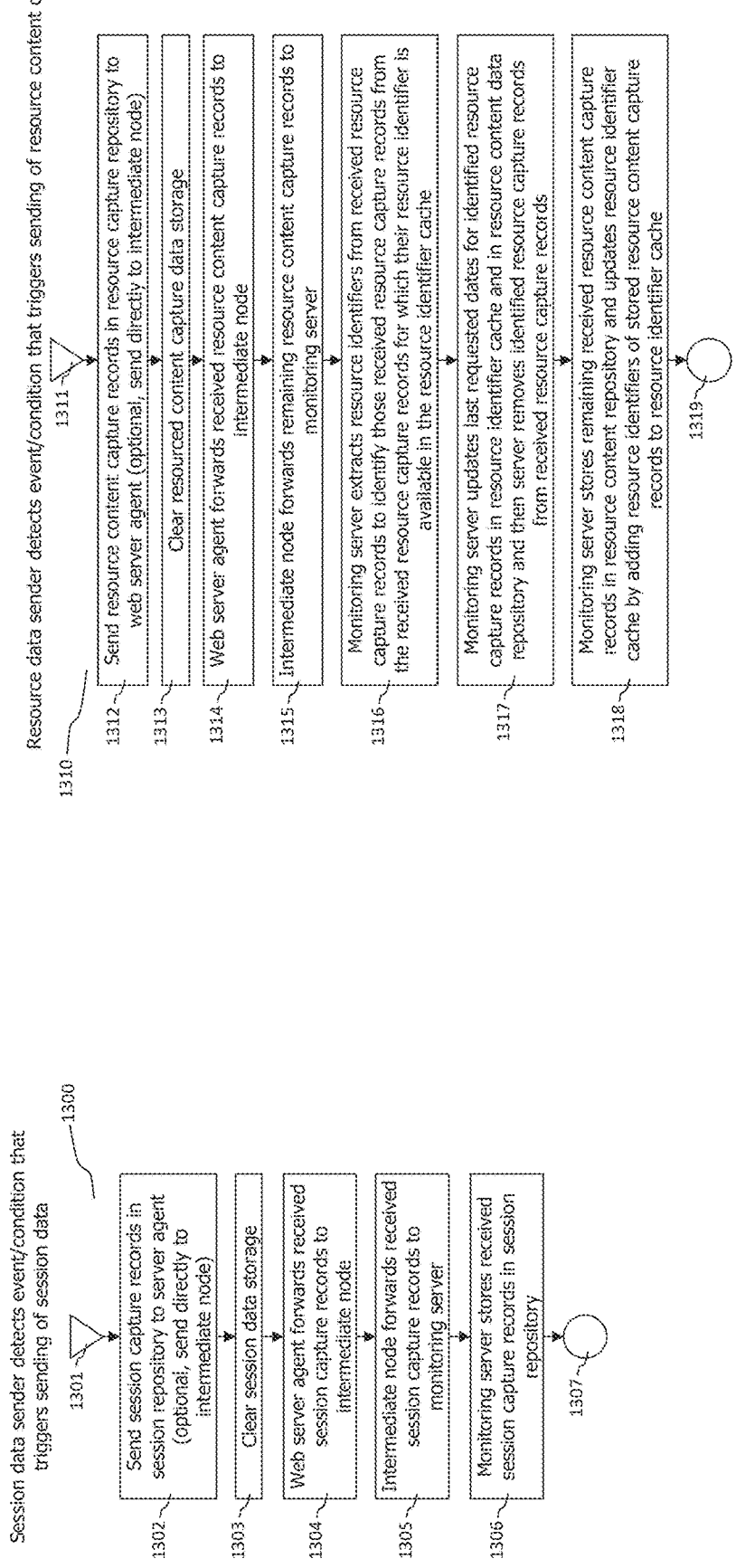
FIG. 13 Transfer of Session Recording Data and Resource Loading Data from Browser Agent to Monitoring Server

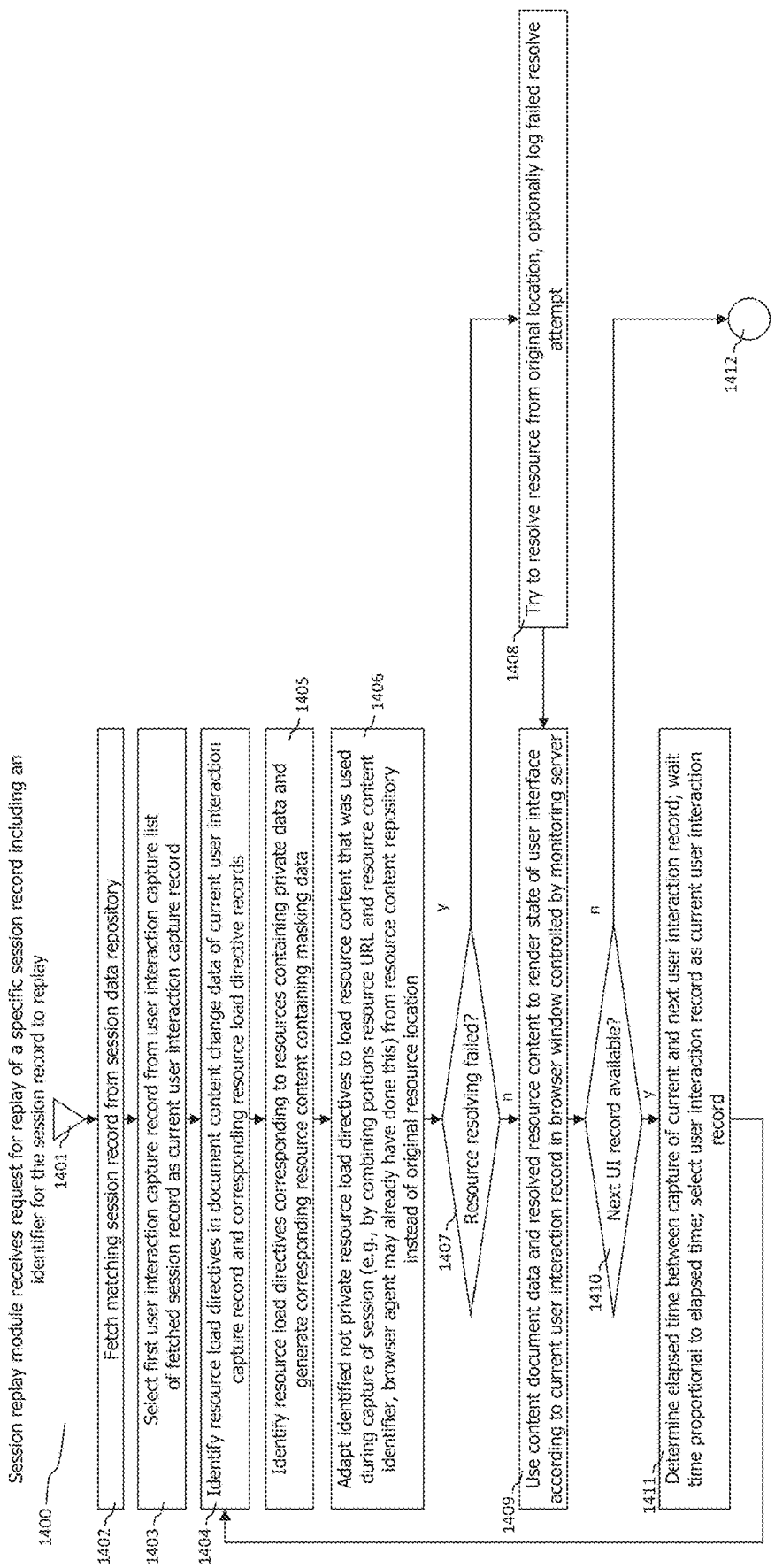

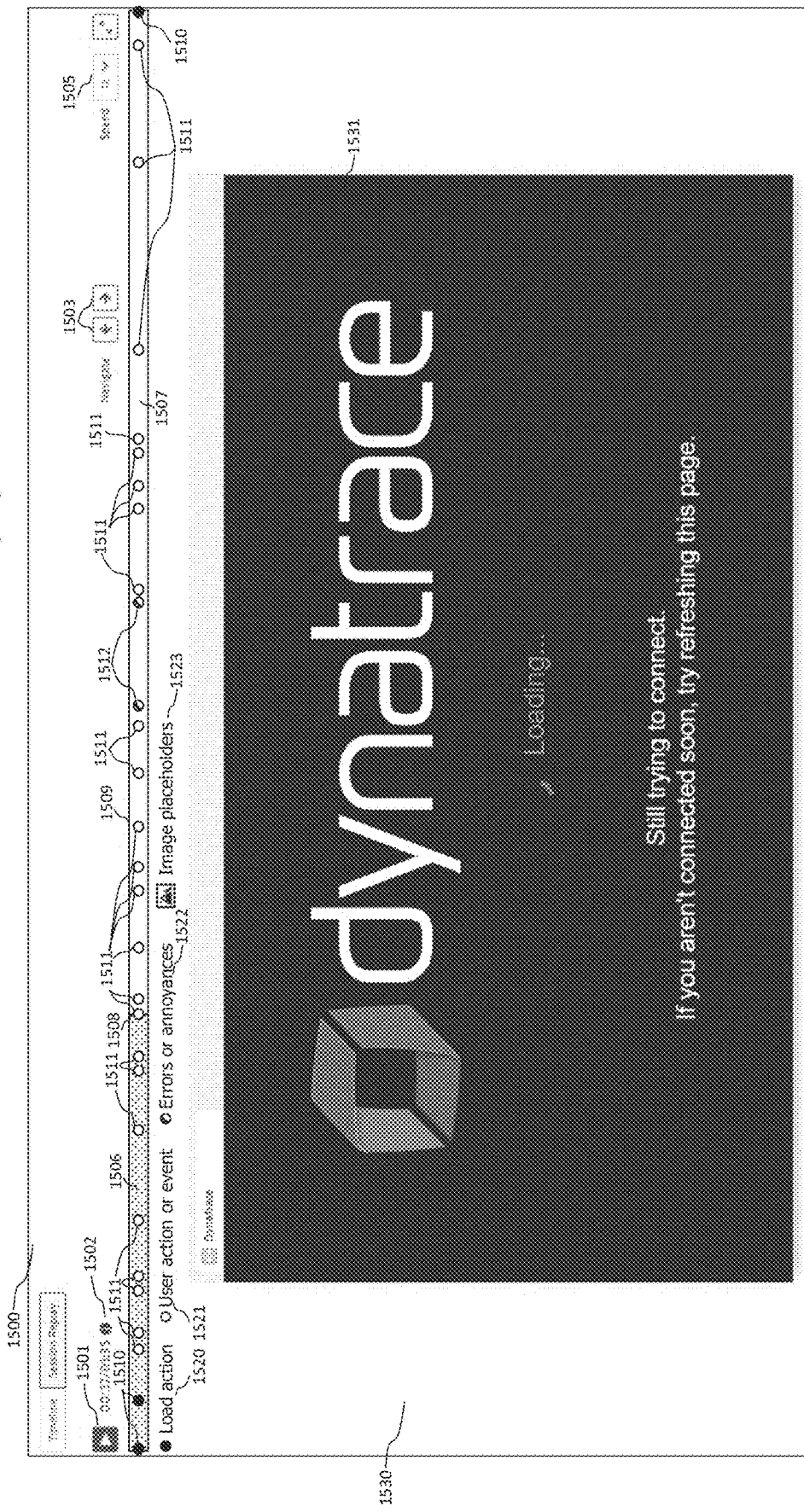
FIG. 15 Screenshot Session Replay

METHOD AND SYSTEM FOR APPLICATION PERFORMANCE NEUTRAL, NETWORK BANDWIDTH OPTIMIZED CAPTURING OF RESOURCES USED DURING THE INTERACTION OF USER WITH A WEB-BASED APPLICATION TO CREATE MONITORING DATA FOR AN ACCURATE VISUAL RECONSTRUCTION OF THE USER EXPERIENCE

CROSS-REFERENCE TO RELATED APPLICATIONS

This application is a continuation of U.S. patent application Ser. No. 17/992,999, filed Nov. 23, 2022; which claims the benefit of U.S. Provisional Application Nos. 63/283,754, filed Nov. 29, 2021 and 63/296,283, filed Jan. 4, 2022. The entire disclosures of each of the above applications are incorporated herein by reference.

FIELD

The disclosed invention generally relates to the improvement of monitoring data to reconstruct individual user interactions as perceived by end-users of an application and more specifically to capture resource data used to generate the user interaction, assign session recording data with resource data used to create the experience that was perceived by the end user and to balance the amount of session recording and resource capturing data to avoid duplicate capturing of resources.

BACKGROUND

Monitoring technologies for web-based applications that observe user interactions, browser side manipulation of content, browser/server communication activities and corresponding server-side processing at a granularity level that allows a post-mortem reconstruction or replay of complete user interaction sessions have become inevitable tools to identify and fix causes of user annoyances or to optimize those web-based user interfaces.

Known solutions, like the one described in U.S. Pat. No. 10,846,193 "Method And System For Real-User Capable Detecting Of The Visual Completeness Of Browser Rendering Process" by B. Lackner et al. deploy agents to content that is interpreted/executed by web browsers, which then instruments the content to detect user interactions, browser side content manipulations, communication activities like sending of requests or receiving responses and the processing of received response data.

The so created monitoring data may be used to reconstruct and replay individual user interaction sequences in a movie-like fashion, where the whole interaction sequence may be replayed, or a viewer may arbitrarily navigate to any point in time of a recorded session.

However, modern web-based applications require, besides core content documents (e.g., HTML files), that specify the structure of displayed content, also additional documents that are used to format and present the content. Those "resource" documents include formatting documents (e.g., CSS files), script, image, or sound files.

Typically, those resources are referred by the core content document via an identifier (e.g., URL or URI), and the web browser requests and loads them when they are required for the interpretation of the core content document.

Session recording tools that are currently known in the art rely on the availability of resource files also during replay time. Those systems capture core content documents (HTML files) and browser side changes of those core documents. Those captured documents and document changes are then used to replay user interactions at a later point in time, where resource documents that are required by those core documents are loaded from their original location.

Although this approach basically works, there are some situations where those resources are no longer available during session replay time. One reason for resources that are unavailable during replay time is that the session recording was performed behind a log-in wall (i.e., the user logged in to some account before session recording started, and all documents/resources are only accessible after a successful login), and the resources are not accessible from outside the log-in wall. Application vendors may address this problem by making those resources available for session replay, but this causes additional, error prone configuration effort for application vendors and may additionally represent a security risk.

In addition to security related access restrictions, also continuous application development, which leads to continuous updates of core documents and resource files poses a problem for the session recording/replay use case. Versions of resource files that were available and used during the recording of a given session may no longer be available during replay time, because they are already replaced by newer versions. Application vendors may also address this problem by making all resource versions available during replay time, but this would add an additional level of complexity to the monitoring system because it needs to address the problem that if the content of one and the same resource changed over time (i.e., the content of a resource changes, while its identifier, like an URL used to request and download it, remains the same), different session recordings may use different version of this resource and it is required to identify and use the correct resource version during replay time.

Consequently, there is need in the field for a session recording solution that also considers resource files used to generate user perceived interaction experience and that assures that exactly those resources are available for a later reconstruction/replay of the captured user experience session.

This section provides background information related to the present disclosure which is not necessarily prior art.

SUMMARY

This section provides a general summary of the disclosure, and is not a comprehensive disclosure of its full scope or all of its features.

This disclosure proposes a monitoring system for web-based applications that is capable to record user interaction session data in a way that content of resource files that were used during the recording of the user interaction that is described by the session data is also available and used during replay of the recorded session.

An agent is injected into content documents that is sent to web browsers for display, which instruments the content on the browser with sensors in a way that conventional session recording data is generated. In addition, the data content of resource files that are referred by the displayed content documents is captured.

Resource content identifiers (e.g., hash values derived from resource content data) are generated from the gathered resource content and resource request directives of captured content documents and content document updates are annotated with respective resource content identifiers. Those annotated content documents or content updates are sent to a monitoring server for later replay.

Captured resource data is also annotated with the content identifier and sent to the monitoring server for storage and later replay.

Annotation of resource request directives may be performed by replacing the original URL of the requested resource by an URL that points to a location that is managed by the monitoring server, where the updated URL may contain path and name of the original URL and the generated identifier.

During replay time, when a monitoring server controlled web browser loads captured content documents and applies captured content document updates to reconstruct and replay the recorded user session, the replaying web browser uses the annotation of the resource URLs to request the version of the resource that was used during the recording of the session from a monitoring server managed resource content repository.

A recorded session represents an individual interaction of an individual user with a monitored application. Therefore, each session recording is a unique set of monitoring data. Resources files, however, are more or less stable and may be referred by a multitude of recorded sessions. Consequently, it is not required to capture resource file data for each observed resource request during the recording of sessions. It would be sufficient to capture the content of each requested resource only once, as long as resource content identifiers are calculated for each observed resource request and all corresponding captured resource request directives are marked with the calculated identifiers. However, session recording and also resource capturing is performed by browser agents deployed to end-user operated and controlled web-browsers. Those web-browsers operate independent from each other and a direct interaction between them, that could be used to detect and suppress superfluous multiple capturing activities for the same resource content is not possible.

Various probabilistic approaches may be applied by variant embodiments to reduce the times that the same resource content is unnecessarily captured multiple times to an acceptable level. Some of those variant embodiments may maintain a resource capture probability which is evaluated on session recording start to randomly select a portion of browser agents that in addition to generating session record data, also capture resource content.

Variations of those embodiments may set the resource capture probability in relation to an observed session recording frequency, by increasing the resource capture probability with decreasing session recording frequency. The rationale of this dependency between session recording frequency and resource capture probability is that for high-frequency scenarios, a low resource capture probability for individual sessions is sufficient to capture all required resources due to the high number of recorded sessions and that for low-frequency scenarios a, higher percentage of session recording agents are required to also capture resources to cover all required resources. Some of those embodiments may employ negative sloped linear functions that use the session recording frequency as input to calculate a session recording frequency dependent resource capture probability that rises with falling session recording frequency and vice versa. Others may specify thresholds for session recording frequencies and assign different resource capturing probabilities to those thresholds to get a session recording frequency dependent resource capturing probability.

Still other variant embodiments may monitor the amount of new, not yet captured resources that are referred by incoming recorded sessions. Those embodiments may identify situations in which the number of new/unknown referred resources increases and temporarily increase the resource capturing probability in this case, to assure that those new/unknown resources are captured rapidly. Such situations with high numbers of new/unknown may arise during the monitoring ramp-up period of a new monitored application (i.e., monitoring has just started, and all resources are still unknown), or when a new version of an already monitored application is deployed which also uses new/unknown resources. Those embodiments may also detect when the amount of new/unknown resourced decreases to an expected level and in response reduce the resource capturing probability to a lower level.

Yet other variant embodiments may analyze recorded sessions to identify frequently, already captured resources. The content identifiers of so identified resources may be provided to browser agents as resource capturing deny list to suppress future capture of those resources.

Still other variant embodiments may maintain separate value ranges or filters of resource content identifiers and assign one of those value ranges to each browser agent that starts session recording. The browser agent may then only capture those resources that have a resource content identifier that falls into the received value range or match the received filter.

Further other variant embodiments may analyze already captured resources and create probabilistic summary representations of the content identifiers of those resources (i.e., Bloom filters) which may be sent to browser agents to identify already captured resources and to avoid recapturing of those resources. Those variants may in addition analyze already recorded sessions to identify the resources requested by recorded sessions for which the content is not yet captured. A probability summary representation may then be created for the identifiers for those required resources and sent to browser agents as an allow or priority list for resource content capturing.

Other embodiments may store content identifiers of already captured resource content on the browser side to avoid duplicate capturing of the same resource by individual web browser instances.

To prevent overload situations some embodiments may maintain per session/per web page resource capturing limits that specify a maximum number of resources that are captured during a session recording sequence or for an individual web page that is viewed during a recorded session. Those embodiments may in addition monitor statistical data for recorded sessions describing the number of web pages viewed per session or the number of resources requested by individual pages. This statistical data may be used to configure those per session/per web page capturing limits. As an example, a per session capturing limit may be manually set to a specific value, and a corresponding per page limit may be calculated by dividing the per session limit by the average number of web page views per session. As such per session/per page limits also introduce a dependency of the probabilities to capture individual resources of a given session (a resource on a web page that is visited late during a recorded session may not be recorded because the limits are already reached), those embodiments may dynamically adapt the probability to capture individual resources during session recording to compensate this dependency. Such embodiments may e.g., increase the probability that an individual resource is captured if it is referred on a later time during the recording of a session.

For security reasons, access to some resource content is restricted. Examples for resources to which such restrictions may apply resources that are requested from different domains than the domain from which the content document requesting them was loaded. In some embodiments, browser agents may detect such not accessible resources and request those resources in a security conformant way (i.e., in form of data and not in form of potentially executable code) which may then be used for resource content identifier calculation or resource content capturing.

Yet other embodiments may in addition consider end-user privacy protection by avoiding the capture of user private data during session recording and resource content capturing. Those embodiments may maintain privacy protection configuration data that may be used to identify elements of content documents or resources referred by content documents that contain private user data. During session recording, this privacy protection configuration may be used to detect such elements or resources containing end-user private data. Content data of identified private elements or resources may be replaced by masking data, like for private data in form of text by a sequence of asterisk characters, or by replacing private images by image documents containing no data. Masking/replacement may be performed during capturing on the browser agent side, or it may be performed in a lazy fashion, during view/replay of recorded sessions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a block diagram of a monitoring system capable to record user interaction session data that also contains content of resources used during execution of recorded sessions.

FIG. 2 describes data records that may be used to store configuration data for the monitoring system and to store monitoring data created by the monitoring system.

FIG. 3 provides a block diagram of an agent that is deployed to web browsers operated by end-users of a monitored application.

FIG. 4 shows processes that may be executed by the monitoring system to manage session recording activity and to cleanup no longer required captured resource content data.

FIG. 5 provided processes to manage the volume of captured resource content data.

FIG. 6 describes cyclical or manually triggered update of browser agent configuration data.

FIG. 7 describes processing performed by intermediate nodes that are data transfer wise located between monitoring servers and server agents deployed to web servers providing a monitored application, to reduce monitoring related overhead created on monitored web servers.

FIG. 8 shows the processing of requests received by monitored web servers by server agents deployed to those web servers.

FIG. 9 describes the processing of observed user interactions and web-browser side activities caused by those user interactions by browser agents.

FIG. 10 shows the processing of detected resource load directives by browser agents.

FIG. 11 provides a process that describes the activities performed by browser agents to decide whether resource content should be captured.

FIG. 12 shows the processing of 3 rd party resources by browser agents.

FIG. 13 describes the sending of session recording and resource content capturing data from browser agents to monitoring servers.

FIG. 14 shows the process of replaying recorded sessions by using captured resource content of resources used during the execution of the replayed session.

FIG. 15 provides a screenshot of an exemplary user interface for replaying recorded session data.

Corresponding reference numerals indicate corresponding parts throughout the several views of the drawings.

DETAILED DESCRIPTION

Example embodiments will now be described more fully with reference to the accompanying drawings.

The disclosed technologies are directed to monitoring the interaction of real end-users with a monitored, web-based application with the goal to capture and conserve all data that is required for an accurate reconstruction of the behavior of the monitored application as it was perceived by the end-users.

Modern, dynamic web-based applications utilize capabilities of web browsers, like script execution and the ability of browser-side manipulation of displayed documents to provide a more interactive, dynamic user experience. This also enables more flexible user interfaces, in which documents that are delivered from a web server to a web browser may be adapted and updated on the web browser according to user interactions and additional data provided by the server.

As a consequence, server-side monitoring is no longer sufficient to completely capture all user interactions. Monitoring systems known in the art, like the system described in U.S. Pat. No. 10,846,193 "Method And System For Real-User Capable Detecting Of The Visual Completeness Of Browser Rendering Process" by B. Lackner et al. use agents operating in web browsers of end users to monitor and report such browser side processing and user interface updates to create monitoring data that allows a full reconstruction of the visualization of the browser rendered user interface that a real-user perceived during a monitored user interaction. Such monitoring systems are also referred to as session recording/session replay systems, as they record data describing user interactions or sessions for a later replay of the end-user perceived user interface during the user interaction session. The provided monitoring data typically contains data describing a version of a document displayed by the web browser at a specific time, and additional data describing browser side updates of the documents. Web browsers typically receive HTML documents from web servers for display, which are then rendered by the browsers. A rendered document is also represented in form of a data structure called document object model (DOM). The DOM provides interfaces for browser side activities, like scripts executing on the web browser to manipulate the DOM.

Manipulations of the DOM cause the browser to change the displayed image according to those modifications.

To render user interfaces in a web browser, web applications typically use, next to a central HTML document which defines structure, layout and content of the user interface rendered by the browser, also auxiliary files which contain styling definitions, images data, sound data, scripting, or other data. Those resource files are essential for an accurate reconstruction of the user interface, as they have great influence into the way web browsers render HTML documents.

Known session recording systems only capture HTML documents and data describing the browser side update of these documents and assume that the resource files that are referred and used by captured HTML files are also accessible during replay time.

Although this may be true for a considerable portion of monitored applications, this does not hold for all applications.

Some applications require users to perform a login sequence for interaction and HTML documents and resource files used by those HTML documents are not available from outside this login-wall. A proper replay of session data is not possible for those types of application, because required resources are only accessible after a successful login, which is not possible during session replay.

Another issue for conventional session recording arises from the rapid application development cycles that are necessary these days to address rapidly changing requirements and user demands. As a consequence, even if a resource file is still available during replay, it may be so in a version that differs from the version that was available during the recording of the session, which may have adverse effects on the accuracy of a replay.

Consequently, session recording systems need to also capture resource files used during the recording of a session and make the captured resource files available during replay of the recorded sessions in a way that the replayed session accesses exactly the same version of the resource files that were used during the recording of the session.

Conventional session recording data, which describes individual user interaction sequences differs from monitoring data that also captures resources that were used during session execution. Each recorded session is unique and individual, as it describes a unique interaction of a specific user with the monitored application. Resources are otherwise more stable and are typically used by large sets of browsers for large sets of user interactions. Therefore, it is not required to capture and report each and every resource that is referred by a HTML document that is part of a recorded session. It should be sufficient to capture and record resource data only in a subset of the web browser that record user interaction sessions. Data describing already captured resources may be sent to session capturing web browsers that are selected to also capture resources to avoid the unnecessary multiple capturing of the same resource by different browsers.

In addition, the fraction of session recording browsers that also capture resources may be set depending on the usage frequency of a monitored application. For applications with low usage frequencies, the fraction of resource capturing browser agents may be increased to assure that all required resources are captured, even if the number of recorded sessions is low. For applications with high usage frequencies, the fraction of resource capturing browser agents may be reduced, as a high frequency of session recordings assures that all required resources are captured and available even with a low fraction of resource capturing browser agents.

Coming now to FIG. 1, which provides a block diagram of a monitoring system that records both user session and resource data.

A web browser 102, which is operated by an end-user 100 of a monitored application, typically executing on a host computing system (not shown) owned or controlled by the end-user displays content 103 for a monitored application. The content 103 may, in addition to other elements, contain user interaction elements 104, which may be used by the end-user to interact with the content and the application.

An interaction with a UI element 104 may trigger 105 content replacement/manipulation activities 106 that may include an interaction with a (monitored) web server 120 to receive new content which replaces the currently displayed content, or data that is used to manipulate the content that is currently displayed in the browser. Technologies well known in the art, like AJAX (for Asynchronous JavaScript and XML) may be used for such in-place updates of currently displayed content. In some cases, a user interaction may trigger a content manipulation without prior web server communication.

Content replacement/manipulation activities 106 may also trigger 107 the execution of resource loading directives 108. As an example, an in-place content update may add a new image element to the content which refers to a not yet loaded image file, which may be loaded as new image resource. As another example, such in-place manipulation may add a new content element that requires additional, not yet loaded styling rules. This additional styling rules may then be loaded in form of an additional style resource, e.g., in form of a CSS (cascading style sheets) file. Loading of new content also causes the loading of resource files referred by the new content.

A browser agent 113 is injected into the currently displayed content 103, typically in form of a browser-side executable script that is embedded in the content. The browse agent 113 may instrument the content 103 with various sensors (not shown), which detect and report to the browser agent user interactions with UI elements 110, content replacement/manipulation activities 111 and adding of resource loading directives 112. The browser agent may generate session replay data from the data received from those sensors, as described in U.S. Pat. No. 10,846,193 "Method And System For Real-User Capable Detecting Of The Visual Completeness Of Browser Rendering Process" by B. Lackner et al.

In addition to processing already described in U.S. Pat. No. 10,846,193, the browser agent 113 may analyze the content of referred resources and create an identifier for the content of the resources which is then attached to resource loading directives of captured session recording data. As an example, captured content may contain a resource load directive like "load type=style location=mystyle.style", which loads resource "mystyle.style" and interprets it as style specification. The browser agent may analyze the content of the file "mystyle.style" and create a hash value (e.g., 1 e4tx) from this content. The resource load directive of the captured content may then be changed to "load type=style location=mystyle_1e4tx.style" to link the resource request with the content of the requested resource file. If a subsequent session then loads a version of "mystyle.style" that has a different content (e.g., due to an update of the application), a different hash value is calculated and appended to the location mystyle.style, which enables the monitoring system to identify at session replay time the content of resource files that were used during session execution/recording time.

In addition to calculating resource content identifiers and updating captured resource loading directives in a way that the content of the loaded resource files can be identified, a portion of browser agents 113 may also capture the content of referred resources, tag captured content with the identifier that was also used to change the resource load directives that caused the loading of those resources and provide the captured and tagged resource content for later replay of captured sessions.

Configuration data 114 for browser agents 113 may be used to determine whether a specific browser agent 113 operating in a specific web browser 102 also performs resource content capturing.

The browser agent may send 125 created session recording and resource capturing data to a server agent 128 which is injected to a monitored web server 120 which provided the content 103 currently displayed by the web browser 102. Alternatively, it may send this data to an intermediate node 140, which is a part of the monitoring system which is deployed in the "network neighborhood" of the monitored web server 120 to reduce the monitoring caused overhead on the monitored web server 120.

The monitored web server 120 may contain a request processing method 126, which receives requests 123 for new content, for data that is required for in-place modifications of currently displayed content, or for resource files, and which creates and sends 124 the requested content or resource data.

Some content 103 variants may also request 121 resource files form web servers 122 that are different from the (monitored) web server 120 that provided the content 103. As such third-party content is not controlled by the vendor of the content 103, it may be assigned a lower trust level, and the browser agent may be required to perform additional actions to access the content of those resource files (see e.g., FIG. 12).

The request processing method 126 may be instrumented by the server agent with sensor (not shown), which reports requests received by the request processing method and which also injects a browser agent and the configuration 114 of the browser agent into requested content. In addition, the sensor may also monitor the server-side executions of the request processing activities and create server-side performance monitoring data for those executions.

The server agent may send session recording and server-side monitoring data 131 and resource capturing data 130 to an intermediate node and receive 129 configuration data 114 for the browser agent 113. The configuration data may also contain data that is required by the server agent to determine whether a specific browser agent operating in a specific web browser should perform session recording, and in addition to session recording also capture the content of resources that were referred and loaded during the execution of the session.

The intermediate node 140 may forward 141, 142 received resource content capturing and session recording/sever side monitoring data to a monitoring server 150 and may receive 143 browser agent configuration updates and forward them to connected server agents 128.

Alternatively, server agents 128 may communicate directly with the monitoring server 150.

It is noteworthy that the monitoring server may in some embodiments be implemented as single server process operating on a single host computing system. In other embodiments it may be implemented in form of a cluster of cooperating server cluster processes operating on different host computing systems to increase the capacity of the monitoring system.

Session recording and server-side monitoring data and resource content capturing data are received by a monitoring data processor and browser agent configuration updater component 156. Received session recording data is stored 157 in a session recording data repository 152 and received server-side monitoring data is stored 160 in a server-side monitoring data repository 154.

Received resource capturing data may be stored 158 in a resource content data repository 153 and may be used to update 159 a resource identifier cache. On receipt of resource capturing data, first the resource identifier cache 155 may be checked if it already contains a resource identifier entry matching the resource identifier of the received resource capturing data. If a matching entry exists in the cache, the received resource capturing data may be discarded as it is already known. If no matching resource identifier exists in the cache, the cache may be updated with such an entry and the received resource content capturing data may be stored in the resource content data repository 153.

The monitoring data processor/browser agent configuration updater component 156 may also constantly monitor 161 the content of the session recording data repository to determine the current session recording frequency of the monitored application. On significant changes of the session recording frequency, the monitoring data processor/browser agent configuration updater 156 may update the browser agent configuration in a way that changes the fraction of session recording browser agents that also capture resource content data. The resource content capture probability may be increased when the session recording frequency is decreased, and it may be decreased when the session recording frequency is increased.

In addition, the monitoring data processor/browser agent configuration updater 156 may access 162 the session recording data repository 152, resource content data repository 153 and the resource identifier cache 155 to generate condensed data that represents the overall status of captured resource content, like the set of resources for which content was already captured or the set of resources that are referred by recorded sessions for which no content has been captured yet. Probabilistic data structures, like Bloom filters, may be used to represent those sets in a space efficient way that makes it feasible to transfer this data to browser agents. Those probabilistic data structures may be populated with the resource identifiers of captured or required resources.

In addition, statistical data about the number of times resources are referred by recorded sessions may be determined to identify most referred resources as "heavy hitters". A list of the content identifiers of those "heavy hitters" resources may be sent to browser agents as support data for the decision to capture the content of a requested resource. A "deny list" may be formed from "heavy hitter" resources for which content is already captured and a "preferred list" may be formed form "heavy hitters" for which content was not yet captured. The "deny list" may be used to identify resources that should not be captured and the "preferred list" to identify resources which should be prioritized for resource content capturing.

A session replay module 151 may receive session replay requests 164 initiated from a user of the monitoring system. Session replay requests 164 may contain identification data for individual recorded sessions, which may be used by the session replay module to fetch 163 corresponding session recording data for the identified sessions from the session recording data repository 152. The session replay module may provide a visualization 165 of sessions for which a replay was requested using the fetched session recording data. During replay of the session, the session replay module may access 164 the resource content data repository 153, to resolve resource content data that was captured during session recording to display reconstructions of the user interface as perceived by the application user during execution of the replayed session.

Coming now to FIG. 2, which describes data structures that may be used to store configuration data for some components of the monitoring system, like monitoring server 150, intermediate node 140 or browser agent 113 or to store and transfer monitoring data like session recording or resource content data.

A monitoring server configuration 200 may be used to specify the session recording and resource content capturing behavior of the monitoring system. A monitoring server configuration may be valid for a specific scope, like the whole monitoring server, a specific tenant/user of the monitoring server, a specific monitored application or a portion of a specific application that may be defined by an URL pattern that identifies requests that are directed to the portion of the monitored application.

A monitoring server configuration 200 may contain but is not limited to a session recording configuration section 201 to control the amount of created session recording data and a resource content capturing configuration section 202 to control the resource content captured behavior of the monitoring system.

The session recording configuration section 201 may contain a desired session recording rate field 202, which may be used to define a desired rate of sessions that should be recorded out of the set of overall executed sessions, and a field to configure an absolute value range for recorded sessions, e.g., in form of minimum and maximum number of sessions that should be recorded per time interval (1, 5, 10 minutes or 1.5 hours, etc.).

The resource content capture configuration section 205 may contain but is not limited to a desired session recording to resource capture ratio 206, to define a fraction of session recordings for which also resource content should be captured, an absolute resource content capturing upper and lower bound 207, in form of a maximum and a maximum number of resources that should be captured per time interval, a configuration section to configure the dependency between absolute session recording volume and resource capture probability/volume 208, to specify how and to which extend resource capture probability should increase with reduced session recording traffic and decrease with increased session recording traffic, a ramp-up configuration for resource content capturing, which may be applied to new created monitoring configurations, when no captured resource content data is available, or after major updates of the monitored application after which a large number of new, not yet captured resources exist, parts of this configuration data may also define how such a major update is detected (e.g., by specifying a resource identifier cache hit threshold, for which an increase above the threshold indicates an update situation with high amounts of unknown resources and a decrease below the threshold value signals a return to a normal situation), and configuration data for absolute per page or per session capture limits 210, which specify the maximum number of resources for which content should be captured for a single page view or during the recording of a single session.

Intermediate node configuration records 220 may be used to specify the behavior of intermediate nodes 140 to execute the desired behavior of the monitoring system as defined by the monitoring server configuration 200. Some configuration data contained in the intermediate node configuration 220 may be derived from monitoring server configuration data and from data describing the current resource capture situation (number of resources for which content is already captured/capture of content is still required, ramp-up/application update situation detected, etc.)

An intermediate node configuration 220 may contain but is not limited to a session recording probability field 221 to specify the probability that an executed session is also recorded (an executed session represents the interaction of a user with a monitored application for which the start of the interaction is recognized by a browser agent. The agent may provide performance and functional monitoring data for this executed session by default. It may in addition be decided to also capture detailed interaction/session recording data for a later reconstruction/replay of the user interface as it was perceived by the interacting end-user), a resource capture probability 222 which specified the probability that during the recording of a specific session also the content of resources used during the execution of the sessions should be captured and reported, and per page/per session resource capture limits 223, which specify the number of resources for which content capturing is allowed per single page view during a session recording or during the whole recording of a session.

A browser agent configuration record 114 may be used to control the monitoring and recording behavior of a specific browser agent.

A browser agent configuration record 114 may contain but is not limited to a general instrumentation and monitoring configuration section 225, which specifies to which extend and with which sensors content should be instrumented and which also contains a session recording flag 226 to specify whether sessions should be recorded by a so configured browser agent, a resource capture configuration section 227, which defines the resource capture behavior of the browser agent and a privacy configuration section 235, which defines rules to identify content elements or resource files that contain data that is private to the end-user of a monitored application and should therefore not be captured.

The resource capture config section 227 of a browser agent configuration 114 may contain but is not limited to resource load directive detection rules 228, which may be used to parse loaded content or a document object data structure (DOM) representing the content for elements referring to resource files that should be loaded, resource content identifier calculation instructions 229 which define a process to calculate identifier from resource content, resource content capture limits 230, specifying the maximum number of resources for which resource content should be captured per page view or per session monitored/recorded by the browser agent, and resource content capture decision support data 232, derived from the data describing the overall set of already captured resource content, resources referred by previously recorded sessions for which no content is yet captured or resources that are referred frequently by recorded sessions, which may be used by the browser agent to optimize the selection of resources for resource content capturing.

The privacy configuration section 235 may contain but is not limited to global privacy settings, which may be used in monitoring situations where global decision to capture all data, no data, etc. are sufficient, and an allow/deny list section 237 which contains content element selector records 240 that may be used to select specific content elements or resource references by their features like type 241 name 242 or other selection patterns 243. Content element identifiers 240 may be used to create allow lists, with a semantic to capture all elements that match at least one of the content element selectors in the list, or to create deny lists having the semantic to capture all elements that match none of the contained content element selectors. As an example, to avoid capturing of image resources that e.g., contain images of individual end-users in an application where all such images are located in a specific folder, a deny list may be created containing a content element selector with the type selection set to "image" and the selection pattern set to the specific folder containing those images. Some alternative embodiments may employ content element selector records 240, which contain an additional allow/deny flag (not shown) for a more fine-grained privacy data configuration.

User interaction capture records 250 may be used to described observed user interactions and the browser side activities caused by those user interactions.

A user interaction capture records 250 may contain but is not limited to an used UI element identifier 251, which identifies the user interaction element which was used for the recorded interaction, interaction detail data 252 which contains data further describing the performed interaction, like for interactions with a text field, the entered text, caused document changes 253, which may indicate a complete content change of a navigation to a new page, or content fragments if the recorded user interaction caused an in-place modification of currently displayed content, interaction timing data 255, which may contain the time of the recorded user interaction, timing data for browser/web server communication caused by the user interaction, timing data for the browser side processing caused by the recorded interaction, like modifications of the content or loading of new resources, or the time when all processing caused by the user interaction were finished, and resource loading data 256 in form of a list of resource load directive records describing all resources that were requested due to the browser side processing caused by the recorded user interaction.

In case a user interaction caused a navigation from a first page of a monitored application to a second page, or from a not monitored page to a first page of a monitored application, used UI element identifier and interaction detail data may be empty.

Caused document change data 253 may be provided in form of content documents or content document fractions (e.g., HTML documents or portions of HTML documents) or in form of serialized DOM trees representing complete contend documents (for the navigation case) or portions of DOM trees representing modified portions of content (for the in-place modification case).

Some embodiments may also provide masking status information 254 for portions of the content that should not be displayed during replay. Other embodiments may already mask private content during capture on the web browser and provide already masked content. Those embodiments may omit masking status information.

Resource load directive records 260 may be used to describe resources that were requested by the browser, e.g., as a consequence of an observed user interaction. Resource load directive records may contain a resource load identifier, e.g., in form of a hash code calculated from the content of the requested resource, resource origin data 262 specifying the location from which the resource was loaded, and resource metadata, like the type of the requested resource, privacy status data and data required to create a masked version of the resource (e.g., for an image resource, the dimensions of the image). Some embodiments may store resource load directive data not in form of separate records, but in form of modifications of resource load directives of captured content data. As example, the resource content identifier may be added to the origin data of the requested resource and privacy status and masking data may be added to the captured version of the resource load directives in form of comments.

Session capture records 270 may be used to store sequences of user interaction capture records 250 that form a complete interaction sequence of an end-user with a monitored application.

Session capture records 270 may contain but are not limited to a browser identification data field 271 which uniquely identifies the instance of the web browser on which the described user interaction sequence was executed and recorded, session identification data 272 uniquely identifying the recorded session, e.g., in form of a combination of the browser identification data and a timestamp for the start time of the recorded session, browser environment description data 273, like type and version of the used browser, type and version of the operating system on which the browser is running, data describing the capacities of the computing system running the operating system and geolocation data for the location from which the web browser is operated, session timing data 274 specifying the start and end time of the recorded session and a user interaction capture list 275 containing user interaction records 250 in the order they were recorded.

Resource content identifier records 280 may be used to store data about already observed/captured resources by browser agents or monitoring servers. Resource content identifier records may be used for a quick browser-side determination whether content for a specific resource was already captured.

A resource content identifier record 280 may contain but is not limited to a resource content identifier 281, e.g., in form of a hash value, resource origin data 282, specifying the location from which the resource was requested, resource metadata 283, e.g., to specify the type of the resource, a last requested date or timestamp 284 which may be set to the time when a resource with matching resource content identifier and resource origin data was last requested, and a captured flag 285, which may be used to distinguish between resources that have been observed during a session recording but for which no content was captured and resources for which content was captured.

A resource content capture record 290 may contain similar data as a resource content identifier record 280 but may in addition also contain the actual captured content 294 of the content version identified by resource location data 292 and resource content identifier 291.

Last requested data 284 and 295 of resource content identifier records and resource content capture records may be used to identify and remove no longer required resource content capture records. For details see FIG. 4, process 410.

Coming now to FIG. 3, which shows a block diagram of the internal components of a browser agent 113.

A browser agent 113 may contain a session data processor unit 301, which may receive user interaction notification data 101, request sending notification data 310 and response receipt and document content update notification data 311 from sensors instrumented to elements of the content 103 into which browser agent was injected. The session data processor may use those notification to identify browser side activities like request sending, receipt of response or browser side manipulation of content that are caused by reported user interactions and create session capture records 270, describing those user interactions, the activities caused by them and also containing captured content modification, update and replacement data required to visually reconstruct monitored user interaction sequences. Created session capture records 270 may be stored in a session recoding data storage 304 for later sending to an analysis, visualization, or storage unit, like a monitoring server 150.

Next to creating session capture records for observed user interaction sequences, the session data processor may also identify resource request directives embedded into content 103 or added to the content due to in-place modifications of the content and forward 320 data describing or identifying those resource request directives to a resource request directive processor 302. Resource request directives may include but are not limited to directives to load image files which are embedded in the content, styling filed defining the way how content is represented, script or sound files. Those resource files have in common that they contain data which is independent of content 113 but is referred by the content to enrich the experience/visualization of the content.

The resource request directive processor 302 uses received resource request directives to fetch the content of the resources referred by those directives and then calculate resource content identifiers from the fetched resource content, e.g., in form of a hash value calculated for the resource content.

The created resource content identifier may then be used 324 to update resource request directives contained in session capture records by adding the calculated resource content identifiers to data for the location (i.e., the URL of the resources) from which the resources are requested. Either resource origin data 262 of resource load directive records 260 may be updated by adding the resource content identifiers, or corresponding resource load directives embedded in the captured document change data 253 may be directly manipulated by adding the resource content identifiers to the resource location data of corresponding resource load directives.

In addition, the resource request directive processor may select, based on browser agent configuration data 114 and on data identifying resources for which content was already captured, those resources for which resource content should be captured and sent to a monitoring server for usage during a later replay of recorded session data.

The resource request directive processor 302 may, for calculated resource content identifiers query 321 a resource identifier storage 303 for a resource content identifier record 280 with a matching resource content identifier 281 and with a set captured flag 285. If a matching resource content identifier record 280 is found, which indicates that the content of the resource was already captured, the resource request directive processor 302 may not capture the content of this resource again.

The resource request directive processor 302 may also check the resource capture flag 230 of the browser agent configuration 114 and only consider resources for resource content capturing if this flag is set.

In addition, the number of already captured resource content elements (script files, style definition files, image files, etc.) may be recorded for resources captured per page or per recorded session and compared with the resource capture limits 231. Resource content may only be captured if those limits are not yet reached.

If the resource request directive processor finally decides to capture the content of a resource, it may create a resource content capture record 290 using the calculated resource content identifier, origin, and type data of the requested resource and the captured resource content. The created resource content capture record 290 may then be stored in a resource content capture data storage 305 for later transfer to a monitoring server.

The resource request directive processor may also create for any resource that it processes and for which no matching resource content identifier record 280 is available in the resource identifier storage 303, create a new matching resource content identifier record 280 using the calculated resource content identifier, origin and type/meta data for the requested resource and store the resource content identifier record 280 in the resource identifier storage. The captured flag 285 may be set if the content of the new resource is selected to be captured.

The last requested date 285 may be set to the creation time for new created resource content identifier records 280. For already existing resource content identifier records it may be set to the current time when a request for the described resource is detected.

A session data sender component 306 may monitor browser environment and browser agent state to determine conditions indicating that sending of stores session recording data (in form of session capture records stored in the session recording data storage) is required 326. Such conditions may include but are not limited to an indication of the browser that the currently displayed content (and also the browser agent) is going to be unloaded and replaced by new content, the storage size of the session recording data storage exceeds a certain limit, or a specific time since the last sending of session recording data has expired. On occurrence of such conditions, the session data sender 306 may send 313 all session capture records currently stored in the session recording data storage and then clear the session recording data storage. The session capture records 270 may be sent to the server agent 128 deployed to the web server 120 that provided the currently displayed content, to an intermediate node 140 or directly to the monitoring server 150.

A configuration data storage 307 may be used to store the browser agent configuration 114, that was set to the browser agent when it was injected by the server agent into the currently displayed content. The configuration data storage may also cyclically poll the server agent for browser agent configuration updates and adapt the stored browser agent configuration 114 on notified changes. The browser agent configuration may be used to control the content instrumentation performed by the browser agent and to switch session recording and resource content capture activities on or off.

A resource data sender 308 may monitor browser environment and browser agent status for conditions indicating that sending of captured resource content data is required. Possible conditions are similar to those detected by the session data sender, like unload indication for current content, size of stored resource content data or time since last sending of resource content data. Available resource content data may be sent to server agent, intermediate node or monitoring server and the resource content capture data storage 305 may be cleared afterwards.

Activities performed by the monitoring server 150 to manage the volume of recorded sessions and to identify and remove no longer required captured resource content are shown in FIG. 4.

The volume of sessions that are recorded by the monitoring system may be controlled by a process 400 that cyclically checks the amount of sessions that were recorded during a past period, compares this observed amount to a target recording amount and performs adaptations of the session recording behavior (i.e., changing the probability to start recording a session when an end-user navigates to an application location that may start session recording) in case the observed amount deviates from the target amount. Session recording typically generates high volumes of monitoring data which vastly exceeds the monitoring data generated for sole performance or functionality monitoring use cases. The large amounts of monitoring data caused by session recording may cause additional monitoring costs, and they may have an adverse effect on the monitored application. Therefore, a regulation mechanism which controls the number of recorded sessions is required.

The session recording volume management process 400 may be executed cyclically (e.g., every 1, 5, 10 minutes) and starts with step 401, when a specific time since the last execution of the process has elapsed.

Following step 402 may then determine the absolute session recording volume for a specific observation period (e.g., last 1, 5, or 10 minutes) and following step 403 may then determine whether the observed absolute session recording volume is within the specified absolute bounds for the session recording volume 203.

Following decision step 404 may end the process with step 406 if the observed session recording volume is within the configured absolute bounds.

Otherwise, step 405 is executed, which calculates a new session recording probability that should result in a future session recording volume that again falls into the desired absolute bounds. Step 405 may determine the traffic volume for the observation period (number end-users of the application that navigated to a location/page of the monitored application that is configured to start a session recording, regardless of session recording was actually started during the observation period) and then calculate a session recording rate for this volume that creates absolute session recording numbers within the configured absolute bounds. The calculated session recording rate may then be sent to connected intermediate nodes 140 as new session recording probability 221. The process then ends with step 406.

Typically, monitoring system users/application operators specify a rate (1%, 5%, 10% etc.) for session recording, which specifies the probability that on application locations which are configured to start a session recording, session recording is actually started. In normal, expected load situation, the number of performed session recordings for this rate also falls into the configured absolute bounds. Only in unexpected load situations, process 400 may intervene and change the session recording rate/probability.

Resource content capturing data is accumulated on the monitoring server and needs to be stored there to support the replay of recorded sessions. To limit the storage requirements of the monitoring server it is required to identify and purge no longer required resource content data.

An exemplary approach to remove no longer required resource content data is shown in process 410. Session recording data may be held available on the monitoring server for replay only for a specific retention time and may be deleted after this retention time. Therefore, resource content may be removed if it is not referred by any recorded session since the duration of this retention time. Example retention times include 30, 45 or 90 days and may depend on type and session recording volume of a monitored application.

The process 410 may be executed cyclically, like once every day at a fixed time and start with step 411 when a specific time since its last execution has elapsed. Following step 412 may then identify those resource content capture records 290 stored in the resource content data repository 153 and those resource content identifier records 280 stored in the resource identifier cache 155 with a last request date 295, 284 that is older than the session retention time. Step 412 may remove those resource content capture records and resource content identifier records from resource content data repository and resource identifier cache.

Step 413 may then identify those resource content identifier records 280 stored in the resource identifier cache 155 with a last request date 284 that is a specific grace period (e.g., 2-4 days) before their expiry date and remove them from the resource identifier cache. The intention of step 413, to first only remove those resources from the cache, is to avoid probable expensive reallocation of memory space for resource content capture records if they should be requested in recorded sessions again. In this case, only the resource identifier cache 155 needs to be updated with a new resource content identifier record 280, but the existing resource content capture records 290 may be kept. Only an update of the last request date 295 to the last request date stored in the new resource content identifier record may be required. The process then ends with step 414.

Coming now to FIG. 5, which describes various processes that may be used to control and manage the volume of captured resource content. The volume of captured resource content per time may be set depending on an observed session recording volume for a past observation period as described in process 500. There are two objectives targeted by this process.

First, the resource content capture volume should be limited to avoid an overload of the monitoring system and potential adverse effects on the monitored system due to large amounts of transferred resource content data. This is of importance for high-volume session recording scenarios, where either the traffic of the monitored application is high, or a relatively high fraction of traffic is observed in form of session recordings.

Second, in case of low-volume session recording scenarios, where only a small number of session recordings are available, a high resource content capture volume, relative to the session recording volume is desired to assure that all required resource content is captured within a reasonable time.

The resource content capture behavior may be configured using a resource content capture probability, which defines the probability with which a session recording browser agent also captures and reports resource content.

The process 500 is executed cyclically (e.g., every 1, 5 or 10 minutes) starts with step 501 when a specific time since its last execution (1, 5 or 10 minutes) has elapsed.

Following step 502 may then determine the absolute session recording volume for an observation period (1, 5 or 10 minutes), e.g., by counting the session capture records 270 that were added to the session recording data repository 152 during the observation period.

Afterwards, step 503 may determine a resource capture probability value for the observed session recording volume. In some variants, a linear dependency between session recording volume and resource capture probability may be realized in step 503 by multiplying the observed session recording volume with a negative slope factor and adding an adaptation offset to the result of the multiplication to get a resource capture probability that linearly falls with rising session recording volume.

Other variants may use a reciprocal dependency between resource capture dependency and session recording volume to implement a dependency between resource capture probability and session recording volume with rapidly increasing resource capture probability for session recording volumes approaching very low values near zero, and a low and rather stable resource capture probability for higher session recording volumes. A function that multiplies the reciprocal value of the observed session recording volume with an adaption factor and then adds an adaption offset to the result of the multiplication may be used to calculate a resource capturing probability for an observed session recording volume. Basically, step 503 may set resource capture probability in a way that the ratio of browser agents that are selected to perform resource content capturing is inversely related to the usage frequency of the application.

Still other variants may use a set of supporting points that define for specific values of session recording volumes, corresponding desired resource capture probabilities. Those variants may then use interpolation mechanism to specify a resource capture probability value for a session recording volume that lies between two of those supporting points.

Generally, step 503 uses a dependency between session recording volume and resource capture probability that maps lower session recording volumes to higher resource capture probabilities and vice versa.

Optional step 504 may then, based on the observed session recording volume, adapt the absolute resource capturing limits for browser agents that were selected for resource content capturing. The resource capture probability calculated by step 503, together with the absolute resource capturing limits per resource capturing agent assure that the resource ingestion capacity of the monitoring system is not overloaded. If session recording volume changed to an extend that also a change of resource capturing volume is required to again meet target resource capturing ranges, this change can either be achieved by changing the resource capture probability, which adapts the number of session recording browsers which also capture resources, it can be achieved by changing the absolute resource capturing limits of session recording browser, which adapts the number of resources captured by individual browsers, while not changing the relative portion of resource capturing browsers, or by a combination of both measures. Explained by a simplified example, resource capturing volume may have fallen by 10%. To compensate this decrease, either resource capturing probability or absolute resource capture limits may be increased by 10%, or each of both may be increased by 5% to compensate this decline. In case the session recording volume is so low that even highest values of resource capture probabilities (where nearly every browser agent is capturing resources) do not generate considerable resource ingest loads, the absolute resource capturing limits (e.g., number of resources captured per recorded session or per page view) may be raised to increase the probability to capture the content of all resources that are required for the replay of recorded sessions.

Optional subsequent step 505 may then cap the change value for the new calculated resource capture probability in a way that the difference between current and new value does not exceed a certain value to avoid oscillating resource capture probabilities. Step 505 may in some variants only limit changes that increase the resource capture probability to a certain maximum change, while allowing uncapped changes that decrease the resource capture probability.

Following step 506 may then send the new calculated resource capture probability, and optionally the new absolute resource capturing limits, to connected intermediate nodes 140. The process then ends with step 507.

The handling of monitoring startup situations, where the monitoring configuration of an application was updated to a configuration including session recording and resource capturing from a configuration that only included performance or functional monitoring is described in process 510.

The process 510 starts with step 511, when session recording and resource content capturing was switched on for a monitored application for the first time. Following step 512 may then minimize or even switch off resource capturing activities during a specific reconnaissance time period (1 hour, 1 day or week). During this time only session recording data will be created, but no, or very limited content of the resources referred by those sessions will be captured. The so recorded sessions may be used to determine the number of different resources referred by the recorded sessions, the average minimum or maximum number of resources referred by a session, or other statistics that describe the resource requirements of recorded sessions. The statistics calculated in step 512 may then be used in step 513 to gradually increase the resource capturing intensity during a resource capture ramp-up time.

After the resource capture ramp-up time is elapsed, step 514 may switch resource capturing to normal mode as described in process 500. The process then ends with step 515.

The detection of updates of a monitored application that is configured for session recording and resource content capturing that introduce large sets of new, not yet captured resource content and the handling of such situations is described in process 520.

The goal of process 520 is to detect situation that introduce large numbers of yet unknown resources and in response to adapt the resource capturing behavior of the monitoring system in to avoid an overload of the monitoring system.

The process 520 may be executed cyclically, like every 1, 5 or 10 minutes and start with step 521, when a specific time (e.g., 1, 5, or 10 minutes) since the last execution of the process has elapsed. Following step 521 may then determine the number of unknown resources that are referenced by incoming recorded sessions. Step 522 may count the referred resources for which no corresponding resource content identifier record 280 is available in the resource identifier cache 155.

Subsequent step 523 may then determine whether the number of resources for which no content is captured is above an expected value. Step 523 may either use a fixed threshold for this determination or it may use a baselining mechanism which observes the number of resources with not captured content over a representative observation time and then calculate a representative baseline value to get a reference value for this decision.

If step 523 determines that the number of resource requests for which corresponding content was not captured is above an expected, normal value, subsequent step 524 may temporarily adapt the resource capture probability until the number of requests for resources for which no content was captured returns to an expected value.

The adaptations performed by step 524 may depend on the session recording volume that is observed in this situation. In high session recording volume situations, the resource capture probability may be reduced to avoid an overload of the monitoring system and in low session recording volume scenarios the resource capture probability may be increased to assure that all required resource content is captured in time.

The process then ends with step 525.

Process 530 describes an exemplary approach to derive an absolute per page resource capturing limit from a given absolute per session resource capturing limit and from observation data in form of already recorded sessions. The process may either be started cyclically, or on user request with step 531. Following step 532 may then analyze available session recording data for an observation period (e.g., last week or month) to determine an average number of pages that were visited during a recorded session. The term visited pages may also include user interaction caused in-place modifications of content, which change the presented content without navigating to another page of the monitored application. As an example, step 532 may determine an average number of user interaction records 250 of session capture records 270 stored in the session recording data repository that were recorded during the observation period.

Step 533 may then calculate a new absolute per page resource capture limit by dividing the given per session capture limit by the calculated average number of page views per recorded session.

Subsequent step 534 may then send the new per page capture limit to browser agents to change their resource capturing behavior as desired. Step 534 may send the updated per page capture limit via intermediate nodes 140 and/or server agents 128. The process then ends with step 535.

Coming now to FIG. 6, which describes the processing of events and conditions that cause the update of static portions (i.e., not related to the evaluation of a statistical probability, like a session recording probability or a resource capturing probability) of the browser agent configuration 114.

The process starts with step 601, either when a user of the monitoring system enters updates to the browser agent configuration, like changed absolute resource capturing limits 231, updated privacy configuration data 235 or changed instrumentation configuration 225, or if data describing the set of already captured or still required resource content has changed to an extent that an update of resource capture decision support data 232 is required.

Following step 602 may then create a new browser agent configuration 114 using changed instrumentation configuration, resource capture limits and privacy configuration Subsequent step 603 may then determine and set new resource capture decision support data, e.g., in form of Bloom filters representing resource content identifiers of already captured resource content or Bloom filters representing resource content identifiers of referred resources for which no content was yet captured. Also, statistical data describing most frequently referred resources ("heavy hitters") may be used to generate resource capture decision support data in form deny lists (heavy hitters for which content was already captured) or preferred lists (heavy hitters for which content is still required).

Following step 604 may then send the updated browser agent configuration to connected server agents 128, either directly or via intermediate nodes 140.

The server agents 128 may in step 605 merge the new received browser agent configuration with current statistic browser agent configuration data (i.e., session recording probability and resource capturing probability) and use the merged browser agent configuration for subsequent injections of browser agents into requested content 103.

The process then ends with step 606.

Processing activities performed by intermediate nodes 140 to transfer browser agent configuration updates and monitoring data in form of session recording, resource capturing or server-side monitoring data between monitoring servers 150 and server or browser agents 113/128 are shown in FIG. 7.

The receipt of browser configuration updates from a monitoring server 150 and its forward to connected server agents 128 is described in process 700.

The process starts with step 701 when browser agent configuration updates, e.g., in form of updated session recording or resource capturing probability settings or updated resource capture decision support data are received by the intermediate node. Step 702 may then create an updated browser agent configuration record 114 using the received configuration update data and following step 703 may then send the new browser agent configuration record 114 to connected server agents 128.

The server agents receiving the updated browser agent configuration may use it for subsequent injections in browser agent injections into requested content as described in step 704. The process then ends with step 705.

The forwarding of received monitoring data from intermediate nodes 140 to monitoring servers 150 is described by process 710.

Monitoring data in form of session recording data, resource content capture data or server-side monitoring data may be received by the intermediate node in initial step 711. Session recording and resource content capture data may either be received from a server agent which received this monitoring data from a browser agent, or it may be received directly from a browser agent to reduce the web server 120 side monitoring overhead.

Following step 712 then forwards the received monitoring data to a monitoring server 150 for analysis, visualization, or storage. The process then ends with step 713.

Coming now to FIG. 8, which describes the processing of a content request by a server agent 128 which is injected into a monitored web server 120. The process 800 starts with step 801, when a content request is received by a monitored web server, the content request is intercepted by a sensor placed in requests processing code 126, and the sensor notifies the server agent about the ongoing request.

The server agent may in subsequent step 802 determine whether the requested content is subject to monitoring. Application vendors may identify portions or functionality of a monitored application that is not business critical and should therefore be excluded from monitoring. Examples for such not business critical functionality may include FAQ pages or pages containing general documentation of the application. To reduce monitoring costs, such application areas may be completely excluded from monitoring. Server agent configuration data in form of URL request identification patterns may be used to distinguish between monitored and not monitored requests.

Following decision step 803 terminates the process with step 811 if the request should not be monitored.

Otherwise, step 804 is executed, which may create a rudimentary browser agent configuration with session recording flag 226 and resource content capturing flag 230 set to false and with not set resource capture configuration 227 and privacy configuration 235. Both resource capture and privacy configuration are only required if the content that is created in response to this request will be selected for session recording or resource content capturing. It would be reasonable to set those configuration data only if they are required.

Following step 805 may then analyze the received request and the content that was created as response to the request, to determine whether conditions to start session recording are fulfilled. As an example, step 805 may analyze the received request to determine whether the request corresponds to application functionality that are configured to start session recording. As an example, a request indicating an attempt of an end-user to log into an application to get access to user-specific content or to personalized search and purchase functionality may be used as application functionality to start session recording. URL request patterns may be used to identify requests to session recording starting application functionality. In addition, the response for such a request may be analyzed to determine whether the login attempt was successful. Session recording may only be started if a login request was detected, and the login attempt was successful.

Decision step 806 may then continue the process with step 807 if no session recording start conditions were detected by step 805. Decision step 807 may then verify whether session recording is currently ongoing on the web browser that sent the received request. Browser agents may, if session recording is ongoing, add data indicating an ongoing session recording and also data indicating the resource capturing status to requests that are sent by the browser. This data may then be evaluated by decision step 807. If the request contains data indicating ongoing session recording, step 807 may continue with step 808, which sets the session recording flag 226 of the browser agent configuration 114 to true and the resource content capture flag 230 to the value that was extracted from the received request. Step 808 assures that, if session recording was started on a specific page, it also continues after a navigation to another page. It also assures that the value of the resource content capture flag 231 remains the same during the session recording. In this case, also browser configuration data like resource content capture configuration and privacy configuration data that was used by the browser agent operated by the browser that sent the request may be reused for the currently created browser agent configuration 113. Mechanisms like HTTP-Cookies may be used to transfer such configuration data form the browser to the web server.

The process then continues with step 812, which may adapt the response creation to inject a browser agent into the created content using the browser agent configuration created and initialized in the previous steps. The process then ends with step 813.

If step 805 detected conditions indicating that session recording should be started, decision step 806 continues the process with step 809, which uses the session recording probability 221 provided by an intermediate node to determine if session recording should be started. Session recording probability may be specified by a value in the range from 0 to 1, where a higher value indicates higher session recording probability. The server agent 128 may draw a random number form this value range and set the session recording flag 226 to true if the random number is smaller than the session recording probability and to false otherwise. This assures that a randomly selected fraction of browsers that fulfill the requirements for session recording are selected to actually perform session recording.

If a browser was selected for session recording, step 809 may continue to determine whether this browser should also capture resource content. The resource capturing probability 222 provided by intermediate nodes 140 may be used for this decision. Again, the resource capture probability may be specified as a value in the range from 0 to 1 and a random number in this range may be created to determine if this browser should also capture resource content. The resource content capture flag 230 may be set to true if the random value is smaller than the resource capture probability and to false otherwise.

Following decision step 810 continues the process with step 812 if the browser was not selected for resource content capturing. Otherwise, step 811 is executed, which sets the resource content capture configuration of the created browser agent configuration as resource content capture configuration data is only required if the browser was selected for resource content capturing. Step 812 is then executed after step 811, which injects the browser agent and the created browser agent config into the created content. The process then ends with step 813.

FIG. 8 only discusses monitoring activities that start session recording and resource content capturing, but it does not cover the topic of stopping session recording as it is of no importance for the novel concepts described herein. For the sake of completeness, some variant methods to end session recording are briefly described here. First, session recording may be terminated after a specific time of inactivity. The browser agent may, before sending of a request to the web server, determine the time that elapsed since the last sending of a request, and, in case the inactivity time exceeds a certain threshold, not set the session recording flag to the sent event, which will terminate session recording. Second, there may be session recording stop conditions defined for a monitored application, like conditions indicating a logout of an end-user from the monitored application. Session recording may be stopped, either by the browser agent or by the server agent if such conditions are detected.

Coming now to FIG. 9, which describes the activities performed by a browser agent 114 that was selected to perform session recording and resource content capturing.

The process 900 starts with step 901, when an end-user 100 interacts 101 with a UI element 104 of currently displayed content 103.

In subsequent step 902, a sensor which may have been instrumented into the UI element by the browser agent 114 may report the occurred user interaction to the browser agent, where the reporting data may contain identification data for the used UI element, timing data for the user interaction and additional interaction data, like for interactions with a text entry element, the entered text.

In following step 903 the browser agent may receive monitoring data describing communication activities caused by the observer user interaction from sensors deployed to communication related portions of the content and in subsequent step 904 the browser agent may receive monitoring data describing changes of the displayed content form placed sensors, either in form of new content received from a web server 120 to replace the currently displayed content, or in form of content update notifications that indicate the in-place modification of currently displayed content. Both types of modification, complete replacement of content, or in-place modification of currently displayed content may include the loading of new resource files (styling definition files, script files, image files or the like) by the browser, to render the new or updated content.

Step 905 may then analyze the content change that was caused by the user interaction to identify new content elements that were added due to the user interaction. In case of a complete content replacement, e.g., caused by the navigation to another page of the monitored application, all elements of the new content may be considered as new. For in-place modifications, the browser agent may identify newly added content elements, e.g., by using content manipulation notifications provided by most web browsers.

After new content portions were identified by step 905, following step 906 then analyzes this new content portions to identify resource load directives (e.g., content portions that trigger the browser to load resource files) in those new content portions.

Following step 907 may then create a new user interaction capture record 250 using the monitoring data provided by previous steps, including the creation of a resource load directive record 260 for each resource load directive identified in step 906. Step 907 may analyze each new resource load directive to determine resource origin and type to set corresponding fields resource origin 262 and resource metadata 263 and create corresponding resource load directive records 260. Created and initialized resource load directive records 260 may be stored in the resource loading data list 256 of the created user interaction capture record 250.

In subsequent step 908, the browser agent 114 requests the calculation of resource content identifiers for the new resource load directives identified by step 906. Calculation of resource content identifiers requires to load and analyze the content of requested resource file to calculate an identifier (hash code) of limited size (in the range of 2 to 25 bytes) that represents this content. Such calculations may require considerable CPU resources. To avoid adverse effects of this calculation on the responsiveness of the monitored application, such calculations may be performed in parallel to conventional browser activities. New browser side script execution features like "Web Workers" enable applications to create additional "worker" threads, which execute in parallel to each other and to a main "display" thread of the web browser. Such features may be used to decouple the calculation of resource content identifiers from the conventional handling of content display related tasks, like detecting and processing user interactions or updating the content in response to changes caused by those user interactions. A detailed description of the resource content identifier calculation, including the capturing and reporting of resource content by the browser agent can be found in FIG. 10.

In step 909, the browser agent adds the resource content identifiers calculated in step 908 to corresponding resource load directive data of captured content change data. Step 909 may set the resource content identifiers 261 of created resource load directive records to the resource content identifier calculated for the resource content requested by the resource load directives described by the resource load directive records. Step 909 may alternatively or in addition, update the resource load directives contained in captured content change data by adding the resource content identifiers to the origin data of those resource load directives. As an example, a resource load directive may indicate the location of a resource file by its path "/myApplication/myStyleResources", and its resource file name "myStyle". A resource content identifier "4574" may be calculated for the content of "myStyle". Step 909 may change the resource file name to "myStyle4574" by appending the resource content identifier to the resource file name. If a subsequent update of the monitored application would then change the content of "myStyle", a different resource content identifier would be created and appended to the file name, indicating the deviating content of the different file versions also in captured session replay data.

Following step 910 then uses privacy configuration data 235 stored in the browser agent configuration 114 to identify those resource load directives that load resource content containing private end-user data which should not be captured. Step 910 may then update captured data for resource load directives referring private data to indicate their security status, e.g., by adding a "private" or "masked" indicator to the resource metadata 263 of resource load directive records 260 describing resource load directives that refer private data, or by adding a tag or comment to portions of captured comment code defining the resource load directive. Step 910 may also capture data that is required to generate a masked representation of the private resource data, like display dimensions for an image resource which may be used during replay to generate a masked version (e.g., black rectangle for masked images) for not captured private resources. The captured representation data for masked content may also be stored in corresponding resource metadata 263, or as comment or tag in captured resource load directive content code.

In subsequent step 911, the browser agent may also analyze captured content to identify portions of the content that contain, according to privacy configuration 235, private user data that should not be captured.

Step 911 may use identification data for individual elements of displayed content, like name, type or identifier of content elements or content element nesting structures to identify privacy protected content element.

After step 911 has identified the content elements containing private data, step 912 may then analyze those content elements to identify portions of the content elements which contain not privacy relevant formatting data and portions containing user-specific, private data and then replace the private user data with appropriate masking content. As an example, step 911 may have identified an element "user hobbies" as containing private data, which specifies a list representation of all hobbies of a specific user. Step 912 may then separate portions of the content element that define the formatting of this list and portions of the content element specifying the hobbies of this user and replace text specifying the names of those hobbies with masking content, like sequences of asterisk characters.

Following step 913 may then fetch the session capture record 270 stored in the session recording storage 304 of the browser agent which represents the currently ongoing session recording and append the created user interaction capture record 250 to the user interaction capture list 250 of the fetched session capture record. If no session capture record is available in the session recording storage 304, which indicates that session recording has just been started, step 913 may create a new one, initialize its browser identification data 271 with identification data uniquely identifying the web browser on which the session recording is performed, its session identification data 272 with data uniquely identifying the starting session recording (e.g., derived from session recording start time and browser identifier), its browser environment description data 273 with data describing type and version of the web browser on which the session recording is performed and type and version of the operating system and host computer system executing the browser, and its session timing data with the start time of the session recording (time when the first user interaction for this session was observed). The created user interaction capture record 250 is inserted into the user interaction capture list 275 of the created session capture record 270 which is inserted into the session recording storage 304.

Process 900 detects user interactions, captures all browser side activities that were caused by those user interactions and appends activity monitoring data to session capture records to incrementally create user interaction and content/user interface change data that is sufficient to reconstruct/replay sequences of user interactions and the reactions of the user interface/content on user interactions.

Coming now to FIG. 10, which describes the processing of identified resource load directives, to calculate resource content identifiers and determine whether resource content should be captured.

The process 1000 starts with step 1001, when a resource load directive is received by the resource request directive processor 302.

Subsequent step 1002 may then determine whether the content of the requested resource is accessible for the browser agent.

Resources may be loaded from the same domain from which also the content requesting these resources was loaded by the browser. In this case, the resources may be considered trustworthy and access to read and process the resource content may be granted to scripts executed by the web browser, like the browser agent.

Resources may also be loaded from third party locations (see 3 rd party web server 122 in FIG. 1). In this case, the content of the loaded resources may not be considered trustworthy and access to this content may be denied for the browser agent.

Step 1002 may determine whether the content of a resource is accessible by comparing the domain from which the currently displayed content was loaded with the domain from which the resource is loaded. If both domains are identical, then step 1001 may indicate accessible resource content. Otherwise, it may indicate that the resource content is not accessible. In some alternative embodiments, step 1002, which is also executing in the security context of the browser agent, may instead try to access the content of the resource and indicate that it is not accessible if this access was denied.

Following decision step 1003 may continue with step 1005 if the resource content is accessible and with step 1004 if it is not.

Step 1004 may use the resource origin data of the resource load directive to create a request for the referred resource that provides the content of the resource in a form that is accessible by the browser agent. Step 1004 may e.g., create a data request (XHR) using the resource origin data to request the resource content in a not-executable way, in which the received content is accessible for reading, analysis and specifically for the calculation of a hash code from the content data. A detailed description thereof can be found in FIG. 12.

Step 1005 then reads the content of the loaded resource file and calculate a hash value that represents the content of the loaded resource. As mentioned before, mechanisms that decouple CPU intensive tasks from display processing activities, like "Web Workers" may be used to separate hash code calculation, and maybe also requesting content in accessible form as performed by step 1004, from display processing activities.

Following step 1006 may then analyze privacy configuration data 235, resource content capturing limits 231 and resource capture decision support data 232, to determine whether the content of the requested resource should be captured. A detailed description of this decision process can be found in FIG. 11.

If step 1006 decided that the resource content should not be captured, decision step 1007 continues the process with step 1009, which provides the calculated resource content identifier for further processing (e.g., for step 909 of process 900).

Otherwise, step 1008 is executed before step 1009, which creates a resource content capture record 290 for the currently processed resource load directive, by setting its resource content identifier 291 to the resource content identifier calculated in step 1005, its resource origin data 292 and resource metadata 293 to corresponding data extracted from the resource load directive, its captured resource contend data 294 to the content data that was requested by the resource load directive, and its last requested date 295 to the current time.

After step 1009, the process ends with step 1010.

Referring now to FIG. 11, which describes the decision process to determine whether requested resource content should be captured.

The process 1100 starts with step 1101, when a resource content identifier for a resource load directive was calculated (e.g., by step 1005 of process 1000), and a decision is required whether the content of the requested resource file should also be stored in form of a resource content capture record 290.

Following step 1102 may then determine whether a resource contend identifier record 280 with a resource content identifier 281 matching the received resource content identifier is stored in the resource identifier storage 303 of the browser agent. The existence of a matching resource contend identifier record indicates that the resource content requested by the received resource load directive was already processed by the browser agent. Following decision step 1103 continues the process with step 1104 if a matching resource contend identifier record was found. Step 1104 sets the last requested time 284 of the resource content identifier 281 to the current time. Afterwards, decision step 1105 checks whether the captured flag 285 of the resource contend identifier record is set. In case the captured flag is set, which indicates that this browser agent already captured the requested content, the process continues with step 1106, which indicates that the resource content should not be captures. The process then ends with step 1115.

If decision step 1105 detects that the capture flag is not set, the process continues with step 1108, which checks if the resource content capture limits 231 defined in the browser agent config are already reached. Step 1108 and following steps are also part of the processing performed when step 1102 finds no matching resource contend identifier record 280 in the resource identifier storage 303 and decision step 1103 continues with step 1107. Those steps will be described in more detail below.

If step 1102 finds no matching contend identifier record, decision step 1103 continues with step 1107, which creates a new contend identifier record, sets its resource origin 282 and its resource metadata 283 with corresponding data from the received resource load directive, its resource content identifier 282 to the received resource content identifier, its last request date 284 to the current time and its captured flag to false. The created contend identifier record may be stored in the resource identifier storage 303.

Following step 1108 may then determine the number of resource content elements that were already captured by this agent for the currently viewed page and during the currently ongoing session recording and compare those numbers to the per page/per session recording capture limits 231 stored in the browser agent configuration 114. Following decision step 1109 continues the process with step 1106 if those limits are already reached.

Otherwise, step 1110 is executed which uses resource content capture decision support data 232 to determine whether the resource content should be captured. Step 1110 may use data describing sets of already captured resource content or sets of resource content that is referred by recorded sessions but is not yet captured to determine whether currently processed resource content should be captured. Resource content capture support data may contain Bloom filters that are initialized with the be initialized with the resource content identifiers of already captured resource content or with the resource content identifiers of referred, but not yet captured resource content.

Bloom filters may be used to determine for an element whether it is already contained in the set described by the Bloom filter, where, due to functionality and characteristics of Bloom filters, the decision that an element is not in the described set is basically error free, and where the decision that an element is contained in the described set is affected by a certain error, which depends on the (memory) size assigned to the Bloom filter and the size of the described set. To avoid this systematic error of Bloom filters they should only be used to determine whether an element is not in the described set. If the Bloom filter decides that the element is in the set, it is a good practice to consider set membership of the tested element as not yet decided.

Therefore, step 1110 may use a Bloom filter describing already captured content to decide that a resource not matching the Bloom filter should be captured, but it should not decide to skip resource content if the Bloom filter indicates a match. Further, a Bloom filter describing referred, but not yet captured content may be used to decide to not capture resource content if it does not match the filter, but it may not be decided to capture the resource content only based on a filter match.

Further, resource content capture support data may contain deny and preferred lists, where deny lists may contain the resource content identifiers of frequently referred and already resolved resource content and preferred lists may contain resource content identifiers of frequently referred but not yet resolved resource content. Step 1110 may use available deny lists to determine whether the currently processed resource content should be captured.

If the result of step 1110 is to not capture the currently processed resource content, following decision step 1111 continues the process with step 1106, which indicates that the resource should not be captured.

Otherwise, step 1112 is executed, which uses a randomly decides whether the currently processed resource should be captured. Step 1112 may e.g., draw a random number in the value range from 0 to 1 and decide to capture the resource if the random number is below 0.5. The random selection process may be adapted for preferred resources (resources with a resource content identifier that is contained in a preferred list) by moving the threshold from 0.5 to a higher value, like 0.75 to increase the probability that preferred resources are captured.

Sequentially deciding for each resource content if it should be captured while only capturing a specific number of resourced due to resource capturing limits introduces a statistical dependency between those decisions as the probability that resource content will be captured declines with the number of previously processed resources, as the probability that the resource content capture limits are already reached raises.

Therefore, to compensate these statistical dependencies, some variants may first identify the set of resource content capture candidates (resource content for which step 1110 decided that it can be captured) and then randomly draw resource content elements from this set for capturing until either no more resource content elements are in the candidate set, or the resource capture limits are reached.

If step 1112 decided to not capture the currently processed resource content, decision step 1113 continues the process with step 1106 to indicate that the resource should not be captured. Otherwise, step 1114 is executed, which first sets the captured flag 285 of the resource content identifier record 289 for the currently processed resource content to true and then indicates that the currently processed resource content should be captured.

The process then ends with step 1115.

The browser agent may also cyclically execute a cleanup process for the resource identifier storage 303 by identifying contained resource content identifier records 285 with a last requested date 284 which is older than a specific threshold (e.g., the retention time of recorded sessions on the monitoring server), and then removing the identified resource content identifier records from the resource identifier storage.

To better coordinate the resource content capturing process amongst session recording browser agents and to decrease the probability of multiple captures of the same resource by different browser agents 113, some embodiments of the monitoring system may also subdivide the value range of resource content identifiers into a set of sub value ranges. As an example, the resource content identifier may be a 32-bit hash value created from resource content. The monitoring system may subdivide this 32-bit value range into 4 30-bit value ranges, where those sub value ranges may be defined by the values of their two leading bits (leading bits 00→first sub value range, 01→second sub value range, 10→third and 11 fourth value range).

When a browser agent is selected for resource content capturing, it may be randomly assigned one of these value ranges. When the browser agent then decides whether a given resource content should be captured, it may first check whether the resource content identifier that was calculated for the resource content falls into the sub value range that is assigned to the browser agent (data for the sub value range selected for the browser agent may be stored in the resource content capture decision support data 232 of the browser agent configuration 114 for the browser agent). Only if the calculated resource content identifier falls into its assigned value range, the browser agent may consider capturing the resource content.

The handling of resource loading directives that request resource content that is not accessible by the browser agent is shown in FIG. 12.

The process 1200 may be started with step 1201, when resource load directive is identified that requests content that is not accessible for the browser agent (e.g., a resource file that is loaded form a domain that is different from the domain from which the content that refers the loaded resource was loaded). Following step 1202 may then analyze the received resource load directive to extract resource content location data (e.g., the URL of the requested resource file) and subsequent step 1203 may then use the extracted resource content location data to create a request for the resource content that provides the resource content in a form that poses no security risk, which is therefore also accessible by the browser agent. Step 1203 may e.g., create an XHR request, which is otherwise used to request data instead of potentially executable resource content.

Step 1204 may then execute the created request to receive the resource content in an accessible form and provide the requested and accessible resource content for further processing (e.g., to step 1005 of process 1000). The process then ends with step 1205.

The sending of session recording and resource content capturing data from browser agents 113 to monitoring servers 150 via intermediate nodes 140 and optionally via server agents 128 is described in FIG. 13.

Process 1300 describes the sending of session recording data and may be started with step 1301, when the session data sender component 306 of a browser agent 113 detects events or conditions that indicate the sending of session recording data. Such may include indications that session recording should be terminated, that the user navigates to a different page or that the memory required for the storage of session capture records 270 in the session recording data storage 304 exceeds a specific threshold.

Following step 1302 may then send the session capture records stored in the session recording data storage to the server agent that is deployed to the web server that provided the currently displayed content 103. Alternatively, step 1302 may send the session capture records directly to an intermediate node 140 to reduce monitoring overhead on the web server.

Step 1303 may then clear the session data storage and following step 1304 may afterwards forward the session capture records from the receiving server agent 128 to an intermediate node 140 if step 1302 did not already send the session capture records directly to the intermediate node. Subsequent step 1305 then forwards the session recording data from the intermediate node to the monitoring server, which stores the received session capture records 270 in a session recording data repository 152 in step 1306. The process then ends with step 1307.

The process 1310 of sending resource content capture data from a browser agent to a monitoring server may be started with step 1301 when the resource data sender 308 detects conditions that indicate the sending of resource content capture data (e.g., navigation to other page, termination of session recording on the browser, or memory size of stored resource content data exceeds certain limit).

Subsequent step 1312 then sends the resource content capturing records 270 contained in the resource content capture data storage 305 either to the server agent or directly to an intermediate node. Afterwards, step 1313 clears the resource content capture data storage 305.

Following step 1313 then clears the resource content capture data storage 305 and subsequent step 1314 forwards resource content capture data from server agent to intermediate node (if step 1312 did not already send the resource content capture data to the intermediate node).

In step 1315, the intermediate node may forward the resource content to the monitoring server 150.

The monitoring server may in step 1316 identify the received resource content capture records for which a corresponding resource identifier record (same resource content identifier 291/281) exists in the resource identifier cache 155, which indicates that the content of those resources was already captured.

Following step 1317 may then, for the received resource capture records identified by step 1316, select the corresponding resource identifier records and resource content capture records (corresponding means same resource content identifier) stored in resource identifier cache 155 and resource content data repository 153 and then update their last request date 284/295 to the last request date 295 of the respective received resource content capture record 290.

Afterwards, step 1307 may remove the resource content capture records identified by step 1316 from the set of received resource content capture records, which only leaves yet unknown resource content capture records in the set of received resource content capture records.

In following step 1318 the monitoring server may create a resource identifier record for each remaining received resource content capture record and store it in the resource identifier cache 155. Step 1318 may then store the remaining received resource content capture records in the resource content data repository 153. The process then ends with step 1319.

The replay of a stored session capture record 270 by the session replay module 151 of a monitoring server 150 is shown in FIG. 14.

The replay process starts with step 1401, when the replay module 151 receives a request 164 to replay a specific recorded session, where the replay request contains data to identify the recorded session that was selected for replay, e.g., in form of session identification data.

Following step 1402 may then fetch the session capture record 270 matching the session identification data contained in the session replay request from the session recording data repository 152, and subsequent step 1403 selects the first user interaction capture record 250 contained in the user interaction capture list 275 of the fetched session capture record as current user interaction capture record.

Step 1404 may the identify resource load directives contained in document change data 253 of the current user interaction capture record. Step 1404 may in some embodiments parse through the document change data to identify portions of the change data that represent resource request (e.g., for HTML, "<img>" or "<link>" tags for resource load directives that load images or other resources like style sheets). Step 1404 may also use resource load directive records 260 contained in the resource loading data list to identify those resource load directives.

Following step 1405 may then identify those resource load directives that were marked during the recording process as containing private data. Resource contend for such resource load directives may not have been captured to protect end-user privacy. Step 1405 may use metadata added to captured resource load directives during the recording process, like privacy flags, to identify those resource load directives. Alternatively, the privacy config 235 that was applied by the browser agent during recording of the session data may be applied to identify such resource load directives. Step 1405 may then create substitute resource content data for identified privacy protected content, e.g., in form of blank image files which may be used instead of the original, not captured resource content. Step 1405 may use captured resource meta data, like the image size, or similar, to create appropriate replacement content.

Step 1406 may then adapt the location data of identified resource load directives that were not identified by step 1405 as referring privacy protected resource data to refer to resource data stored in the resource content data repository 153 instead of referring to the original location of the content.

As a simplified example, a monitoring server 150 may make captured resources stored in its resource content data repository 153 available via a basis access point "monitoring". An identified resource load directive may contain a resource origin of "myApplication/myStyle_3451", where "myApplication" may absolutely refer to the location from which the monitored application loads resource files, "myStyle" refers to the name of the loaded resource file and "_3451" is the resource content identifier that was appended by the browser agent during the recording process. Captured resource content may be accessible from the resource content access point via their content-tagged file name, in this case "myStyle_3451". Therefore, step 1406 may change the resource origin from "myApplication/myStyle_3451" to "monitoring /myStyle_3451" to redirect the resource loading directive to the captured version of the resource content that was used during recoding of the session.

Following decision step 1407 may check whether the resource content data repository 153 contains the desired captured resource content. In case the requested captured resource content is not found, step 1408 is executed, which tries to load the resource content form its original location (for the example described above, this would be the URL without appended resource content identifier, ""myApplication/myStyle"). In case step 1408 fails, an error message describing the error conditions may be logged and substitute content may be created and used instead of original content.

Step 1409 is executed if resource content resolving from the resource content data repository 153 was successful or otherwise after step 1408, which renders the current state of the contend document as stored in the document change data 253 of the current user interaction capture record 250 using the resolved resource content. Step 1409 may use substitute content created by step 1405 for resources referring private resource content. A browser window may be created by step 1409, where the browser window may be adapted to browser environment description data 273 stored in the session capture record 270 to create a browser environment that matches the conditions under which the session was recorded.

Following decision step 1410 may then determine whether the user interaction capture list 275 of the processed session capture record 270 contains subsequent user interaction capture records 250 and end the process with step 1412 if no subsequent user interaction capture record is available.

Otherwise, step 1411 is executed, which determines the time that elapsed between the recording of the current user interaction capture record 250 and the next user interaction capture record in the user interaction capture list 275 (e.g., by analyzing and comparing the interaction timing data 255 of both records) and waits a time that is proportional to the determined elapsed time. Afterwards, step 1411 may select the next user interaction capture record as current user interaction capture record and the process may continue with step 1404.

Coming now to FIG. 15, which provides a screenshot of an exemplary user interface that may be used to replay recorded sessions. The proposed replay user interface is subdivided into a control section 1500, which may be used for a temporal navigation through the time covered by a viewed session recording and a visualization section 1530, which displays the monitored user interface at a specific point in time selected by the control section.

The control section 1500 may contain a "play" button 1501 which may be used to start and stop replay of the recorded session at any time covered by the recorded session. Session detail data 1502 may provide data about the replayed session, like its duration or the currently visualize session time. It may also provide data about the context of the recorded session, like type and version of the browser in which the session was recorded or type and version of the operating system/host computer executing this browser.

A timeline 1509 may represent the time period covered by the replayed session and mark the time 1508 at which the currently displayed state of the user interface 1531 was recorded and the elapsed session time period 1506 before this time and the session time 1507 after this current session time.

User interaction events (i.e., the user interaction capture records 250 stored in the user interaction capture list 275 of the replayed session capture record 250) may be represented 1510, 1511 and 1512 in the timeline, where different symbols may be used to distinguish between load actions (actions loading new content) 1510, user actions (actions causing in-place modification of loaded content) 1511 and erroneous or annoying actions (1512 actions that caused an error, or for which processing time exceeded a certain threshold)

Navigation buttons 1503 may be used to navigate between different events and a speed selection element 1505 may be used to set the speed of the session replay relative to the original recording time.

A legend may be used to explain different visualizations of load actions 1520, user actions 1521 and erroneous/annoying events 1522. The legend may also explain the visualization of image placeholders 1523, which may be used by the visualization section to represent images for which referred (image) resource content could not be resolved.

The visualization section 1530 renders 1531 the user interface as it was shown by the monitored browser at the visualization time 1508 selected in the timeline 1509.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for reconstructing user interactions with an application executing on a computing device in a distributed computing environment, comprising:
    capturing, by a browser agent, data for a content change that occurs in content displayed by a web browser, where the browser agent is instrumented in the content and the content is provided by the application;
    identifying, by the browser agent, one or more resource files used to implement the identified content changes;
    for each of the one or more resource files, determining, by the browser agent, an identifier for content of a given resource file;
    for each of the one or more resource files, adapting, by the browser agent, a reference to the given resource file in the data for the content change, using the identifier for the content of the given resource file;
    sending, by the browser agent, the data for the content change over a computer network to a monitoring server;
    for select ones of the one or more resources, sending the content of the given resource file as resource content data to the monitoring server;
    reconstructing, at the monitoring server, content changes that occurred on the web browser using the data for the content change and the resource content data.

2. The method of claim 1 wherein identifying content changes further comprises receiving, by the browser agent, monitoring data describing communication activities caused by a user interaction from a sensor, where the sensor is instrumented in the content.

3. The method of claim 1 wherein the identifier for the content of the resource file is a hash value from a hash function applied to content of the resource file.

4. The method of claim 1 wherein adapting a reference to the given resource file comprises adding the identifier for the content of the given resource file to at least one of name of the given resource file or location of the given resource file.

5. The method of claim 1 further comprises sending, by the browser agent, the data for the content change over the computer network to an intermediate node; and sending, by the intermediate node, the data for the content change over the computer network to the monitoring server.

6. The method of claim 5, where reconstructing user interactions at the monitoring server includes
    receiving a request to replay content changes occurred at the web browser; and
    redirecting a request for a given resource file to content of the given resource file using the identifier for the content of the given resource file.

7. The method of claim 1 further comprises capturing, by the browser agent, content of a given resource file in accordance with configuration data; and creating, by the browser agent, a resource content capture record for the content of the given resource file, where the resource content capture record includes the identifier for the content of the given resource file and the content of the given resource file.

8. The method of claim 7 wherein the browser agent is one of a plurality of browser agents operating in the distributed computing environment and only a subset of browser agents from the plurality of browser agents are configured to capture content of resource files and create resource content capture records for the resource files.

9. The method of claim 8 wherein number of browser agents in the subset of browser agents is set according usage frequency of the application, such that ratio of browser agents in the subset of browser agents in relation to the plurality of browser agents is inversely related to the usage frequency of the application.

10. The method of claim 7 further comprises for the application, monitoring, by the monitoring server, number of resource files referenced in session data which have no corresponding resource content record; comparing, by the monitoring server, the number of resource files referenced in session data which have no corresponding resource content record to a threshold; adapting, by the monitoring server, the configuration data based on the comparison; and sending, by the monitoring server, the adapted configuration data to the browser agent.

11. The method of claim 7 further comprises comparing, by the browser agent, the identifier for the content of the given resource file to identifiers stored in a resource identifier data store before the step of creating a resource content capture record, where the resource identifier data store resides at the web browser displaying the content provided by the application; creating, by the browser agent, the resource content capture record only in the absence of the identifier for the content of the given resource file in the resource identifier data store; and storing, by the browser agent, the identifier in the resource identifier data store in response to creating the resource content capture record.

12. The method of claim 11 wherein the resource identifier data store is further defined as a Bloom filter.

13. The method of claim 7 further comprises
subdividing possible values for the identifiers for the content of resources files into a plurality of subranges; assigning one of the subranges in the plurality of subranges to the browser agent; and creating, by the browser agent, a resource content capture record for the content of the given resource file only when the identifier for the content of the given resource file is within the subrange assigned to the browser agent.

14. The method of claim 7 further comprises sending the resource content capture record to the monitoring server; storing, by the monitoring server, the received resource content capture record; during reconstruction of user interactions at the monitoring server, resolving the adapted reference to the given resource file contained in the data for the content change by redirecting the adapted reference to the resource content included in the resource content capture record; where redirecting the adapted reference includes comparing the identifier of the adapted reference with the identifier of the resource content capture record; and redirecting the adapted reference only to the content of the resource content capture record when identifier of adapted reference and identifier of resource content capture record match.

15. A non-transitory computer-readable medium having computer-executable instructions that, upon execution of the computer-executable instructions by a processor of a computer, cause the computer to capture data for a content change that occurs in content displayed by a web browser that is execution on the computer, where the content is provided by interactions with an application; identify one or more resource files used to implement the content changes; for each of the one or more resource files, determine an identifier for content of a given resource file; for each of the one or more resource files, adapt a reference to the given resource file in the data for the content change using the identifier for the content of the given resource file; send the data for the content change over a computer network to a monitoring server; for select ones of the one or more resources, sending the content of the given resource file as resource content data to the monitoring server.

16. The non-transitory computer-readable medium of claim 15 further causes the computer to receive monitoring data describing communication activities caused by the given user interaction from a sensor, where the sensor is instrumented in the changed content.

17. The non-transitory computer-readable medium of claim 15 wherein the identifier for the content of the resource file is a hash value from a hash function applied to content of the resource file.

18. The non-transitory computer-readable medium of claim 15 further causes the computer to adapt a reference to the given resource file by adding the identifier for the content of the given resource file to at least one of name of the given resource file or location of the given resource file.

19. The non-transitory computer-readable medium of claim 15 further causes the computer to capture content of a given resource file in accordance with configuration data; and create a resource content capture record for the content of the given resource file, where the resource content capture record includes the identifier for the content of the given resource file and the content of the given resource file.

20. The non-transitory computer-readable medium of claim 15 further causes the computer to compare the identifier for the content of the given resource file to identifiers stored in a resource identifier data store before the step of creating a resource content capture record, where the resource identifier data store resides at a web browser displaying the content provided by the application; create the resource content capture record only in the absence of the identifier for the content of the given resource file in the resource identifier data store; and store the identifier in the resource identifier data store in response to creating the resource content capture record.

21. The non-transitory computer-readable medium of claim 15 further causes the computer to subdivide possible values for the identifiers for the content of resources files into a plurality of subranges; assign one of the subranges in the plurality of subranges to the browser agent; and create a resource content capture record for content of the given resource file only when the identifier for the content of the given resource file is within the subrange assigned to a browser agent.

* * * * *